United States Patent
Gregerson et al.

(10) Patent No.: US 10,940,416 B2
(45) Date of Patent: Mar. 9, 2021

(54) AIR FILTER DEVICES WITH GAP SEALING UNIT

(71) Applicant: 3M INNOVATIVE PROPERTIES COMPANY, St. Paul, MN (US)

(72) Inventors: Glen O. Gregerson, Hudson, WI (US); Thomas J. Herbrand, Eagan, MN (US); David J. Prince, Saint Paul, MN (US); Danielle M. Schreppel, Saint Paul, MN (US); Craig D. Thompson, Inver Grove Heights, MN (US); Judd D. Olson, Deephaven, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 383 days.

(21) Appl. No.: 15/762,409

(22) PCT Filed: Sep. 16, 2016

(86) PCT No.: PCT/US2016/052047
§ 371 (c)(1),
(2) Date: Aug. 13, 2018

(87) PCT Pub. No.: WO2017/053177
PCT Pub. Date: Mar. 30, 2017

(65) Prior Publication Data
US 2018/0345194 A1    Dec. 6, 2018

Related U.S. Application Data

(60) Provisional application No. 62/222,836, filed on Sep. 24, 2015.

(51) Int. Cl.
*B01D 46/00*    (2006.01)
*B01D 46/52*    (2006.01)
(Continued)

(52) U.S. Cl.
CPC ..... *B01D 46/0005* (2013.01); *B01D 46/0002* (2013.01); *B01D 46/0032* (2013.01);
(Continued)

(58) Field of Classification Search
CPC ............ B01D 46/0002; B01D 46/0005; B01D 46/10; B01D 46/521; B01D 2271/027;
(Continued)

(56) References Cited

U.S. PATENT DOCUMENTS 2,639,004 A    5/1953   McIntyre
4,420,315 A    12/1983  Kershaw
(Continued)

FOREIGN PATENT DOCUMENTS

CN    09315142    12/1997
CN    19846652    3/2000
(Continued)

OTHER PUBLICATIONS

International Search Report for PCT International Application No. PCT/US2016/052047, dated Nov. 29, 2016, 3 pages.

*Primary Examiner* — Robert Clemente
(74) *Attorney, Agent, or Firm* — Kevin Weber

(57) ABSTRACT

An air filter device including an air filter unit and an expansion unit. The air filter unit includes a filter media assembly maintained by an outer frame assembly. The outer frame assembly defines exterior length, width and depth dimensions of the air filter device in an initial state. The expansion unit provides one or more of an expanded length, width or depth in an expanded state of the air filter device. Portions or an entirety of the expansion unit can provided apart from the air filter unit in a deliver condition of the air filter device, or can be assembled to the air filter unit prior to delivery to a user. The air filter devices of the present disclosure are useful with a wide variety of differently size (Continued)

air handling devices, able to readily seal with an air handling device compartment via the expansion unit.

18 Claims, 11 Drawing Sheets

(51) Int. Cl.
    *F24F 13/28* (2006.01)
    *F24F 3/16* (2006.01)
    *B01D 46/10* (2006.01)

(52) U.S. Cl.
    CPC ........... *B01D 46/10* (2013.01); *B01D 46/521* (2013.01); *F24F 3/1603* (2013.01); *F24F 13/28* (2013.01); *B01D 2271/027* (2013.01); *B01D 2275/203* (2013.01)

(58) Field of Classification Search
    CPC .... B01D 2275/203; F24F 3/1603; F24F 13/28
    See application file for complete search history.

(56) References Cited

U.S. PATENT DOCUMENTS

| | | | |
|---|---|---|---|
| 5,273,564 A | 12/1993 | Hill | |
| 5,486,410 A | 1/1996 | Groeger | |
| 5,597,645 A | 1/1997 | Pike | |
| 5,662,728 A | 9/1997 | Groeger | |
| 5,968,217 A | 10/1999 | Stein | |
| 5,972,808 A | 10/1999 | Groeger | |
| 6,033,454 A | 3/2000 | Hoeffken | |
| 6,057,256 A | 5/2000 | Krueger | |
| 6,152,980 A | 11/2000 | Culwell | |
| 6,464,745 B2 | 10/2002 | Rivera | |
| 6,485,538 B1 | 11/2002 | Toyoshima | |
| 6,740,137 B2 | 5/2004 | Kubokawa | |
| 6,858,297 B1 | 2/2005 | Shah | |
| 6,916,352 B2 | 7/2005 | Sutton | |
| 6,955,702 B2 | 10/2005 | Kubokawa | |
| 7,037,354 B1 | 5/2006 | Dimicelli | |
| 7,150,774 B2 | 12/2006 | Kubokawa | |
| 7,169,202 B2 | 1/2007 | Kubokawa | |
| 7,320,720 B2 * | 1/2008 | Ticknor | B01D 46/002 55/483 |
| 7,452,396 B2 | 11/2008 | Terlson | |
| 7,622,063 B2 | 11/2009 | Sundet | |
| 7,695,660 B2 | 4/2010 | Berrigan | |
| 7,858,163 B2 | 12/2010 | Angadjivand | |
| 7,947,142 B2 | 5/2011 | Fox | |
| 7,959,699 B2 | 6/2011 | Privitt | |
| 8,157,881 B1 | 4/2012 | Anoszko | |
| 8,162,153 B2 | 4/2012 | Fox | |
| 10,247,442 B2 * | 4/2019 | Brooks | F24F 13/28 |
| 10,350,533 B2 * | 7/2019 | Barry | B01D 46/103 |
| 2003/0159415 A1 | 8/2003 | Parker | |
| 2004/0182055 A1 | 9/2004 | Wynn | |
| 2005/0284116 A1 * | 12/2005 | Duffy | B01D 46/521 55/497 |
| 2006/0037296 A1 * | 2/2006 | Duffy | B01D 46/0001 55/495 |
| 2009/0077937 A1 | 3/2009 | Privitt | |
| 2010/0101197 A1 | 4/2010 | Livingstone et al. | |

FOREIGN PATENT DOCUMENTS

| | | |
|---|---|---|
| CN | 2001311372 | 11/2001 |
| CN | 20070116296 | 12/2007 |
| CN | 201133210 | 10/2008 |
| CN | 201526248 | 7/2010 |

* cited by examiner

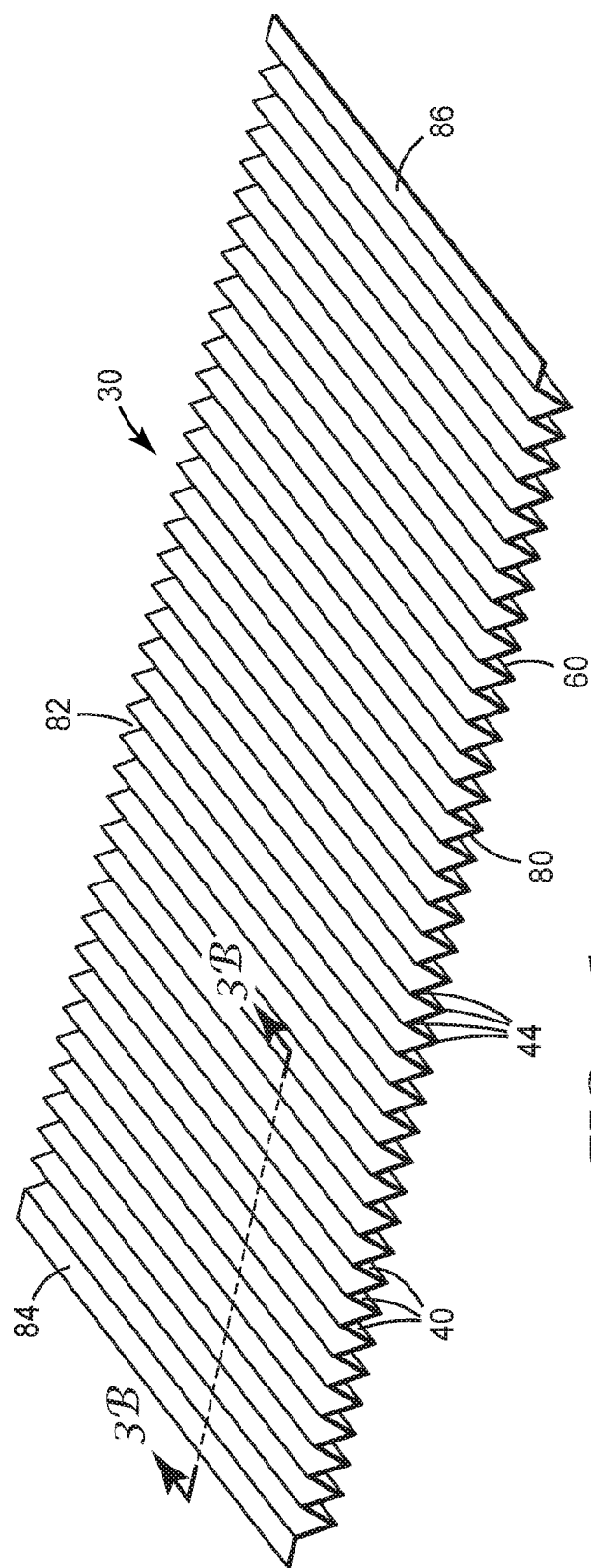
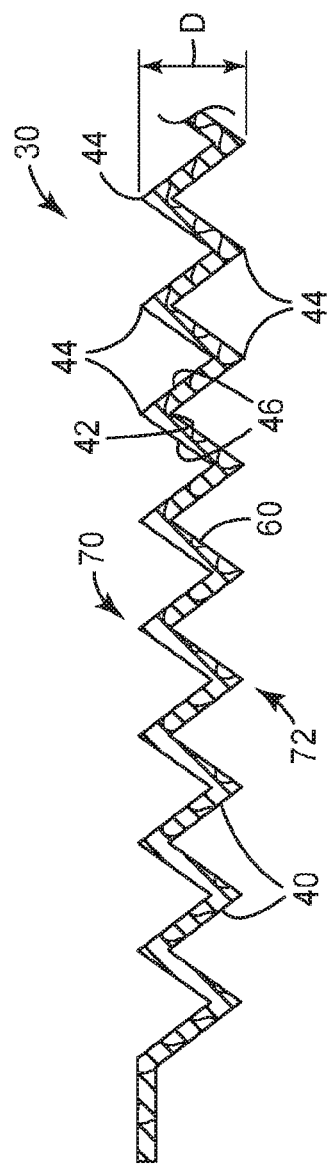
FIG. 3A
FIG. 3B

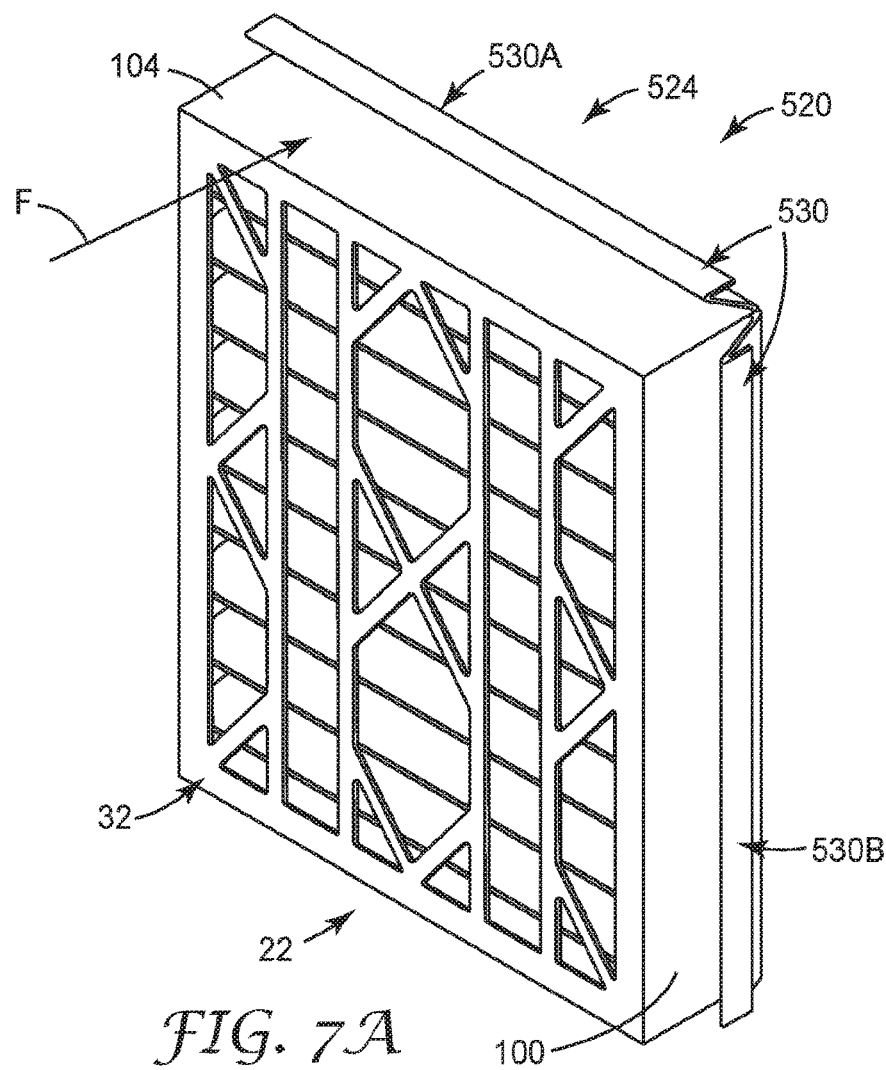
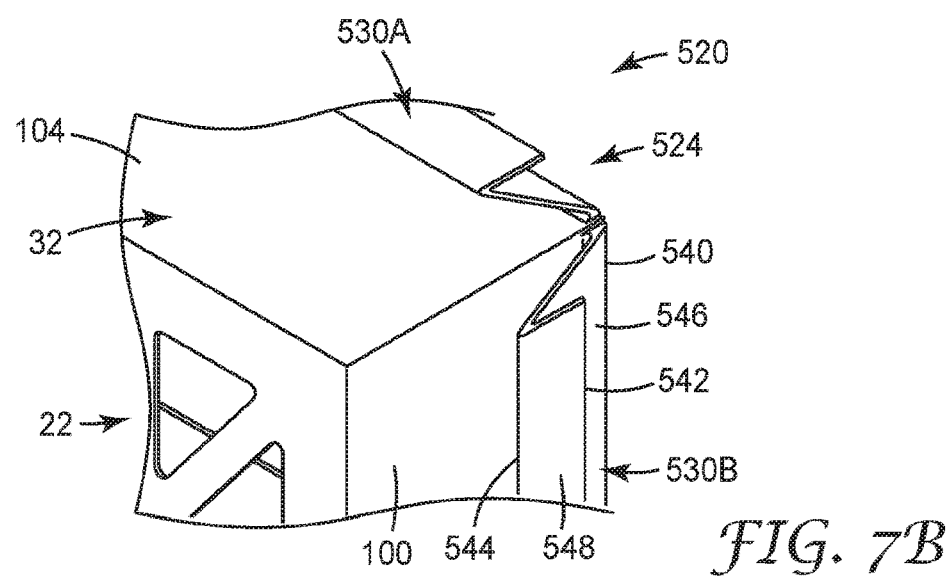

AIR FILTER DEVICES WITH GAP SEALING UNIT

CROSS REFERENCE TO RELATED APPLICATIONS

This application is a national stage filing under 35 U.S.C. 371 of PCT/US2016/052047, filed Sep. 16, 2016, which claims the benefit of U.S. provisional Application No. 62/222,836, filed Sep. 24, 2015, the disclosure of which is incorporated by reference in its/their entirety herein.

BACKGROUND

The present disclosure relates to air filters. More particularly, it relates to expandable air filters, such as expandable HVAC air filters, appropriate for use with multiple, differently sized air filter compartments.

Air filters are commonly used in forced air systems (e.g., residential heating, ventilation and air conditioning (HVAC) systems) in order to remove dust, dirt particles and the like. With many HVAC installations, a disposable air filter is conventionally employed. Such air filters typically include a filter media surrounded and supported by an outer frame. In addition to supporting the filter media, the outer frame rigidly defines a perimeter size and shape of the air filter. Other supporting and/or reinforcing components, such as mesh screens, adhesive beads, etc., may also be included. After a period of use, these filters become dirty or clogged and must be replaced.

To facilitate air filter replacement, HVAC systems conventionally house the air filter within a user-accessible compartment. The air filter is placed into and/or retrieved from the compartment via an access slot. In some instances, the air filter alone is inserted through the slot. In other instances, a separate cabinet is provided into which the air filter is placed, followed by insertion of the loaded cabinet through the slot. In all instances, upon final insertion, a seal is desirably established between the outer frame of the air filter and framework of the compartment so as to prevent airflow around the air filter during use (and thus prevent un-filtered airflow from passing through the HVAC system). Preferred replacement air filters have a size that corresponds with the expected size (in terms of height, width and depth) of the HVAC system's air filter compartment.

A number of "standard" HVAC air filter compartment sizes have gained industry acceptance over time and are widely employed. Replacement air filter manufacturers, in turn, attempt to make available for retail purchase air filters corresponding with these standard sizes, allowing a customer to select a particular air filter that should fit their HVAC system's compartment configuration. The rigid outer frame of conventional air filters dictates that the replacement air filter has the same size when shipped to a retailer, when presented to potential purchases, and when installation to the HVAC system is attempted. Because these typical HVAC air filters are thus rather bulky, they undesirably occupy a relatively large volume of space on transportation vehicles and retailer shelves. Further, where the retailer has limited available shelf space and/or desires to display for purchase a large number of differently-sized air filters, only a small number of larger-sized air filters (e.g., deep pleat air filters) can reasonably be presented on the retailer's shelving system. When the small number of a certain air filter size are subsequently removed from the shelf for purchase and the retailer does not consistently replenish the display shelf, it may undesirably appear to the next potential purchaser that the particular air filter size of interest is out of stock.

In addition, a potential customer may not immediately recall with confidence the correct air filter size for their HVAC system while at the retailer's place of business; this uncertainty can be exacerbated when a large number of different air filter sizes are displayed. Rather than purchase a potentially incorrectly-sized air filter, the consumer will instead decide to delay air filter replacement to a later date, potentially leading to inefficient operation of the HVAC system if a new air filter is not actually purchased for an extended period of time.

Moreover, the actual air filter compartment size associated with a particular HVAC system will oftentimes deviate from the designated "standard" or expected size. For example, the HVAC system manufacturer's specifications may identify an air filter size of 16"×20"×4", yet the actual air filter compartment is slightly smaller or slightly larger in one or more dimensions. Thus, a purchased 16"×20"×4" replacement air filter may not be an optimal fit for the actual HVAC system compartment (e.g., the purchased air filter may be too large for straightforward insertion, or may be too small and lead to suboptimal HVAC system operation). These circumstances can be frustrating for the user, and can lead to even greater uncertainty when considering the next replacement air filter purchase.

The above-described concerns with conventional replacement HVAC air filters can also arise in other contexts. Many other types of air handling devices or systems (e.g., room air purifiers, window air filters, etc.) make use of a replaceable, rigid-frame air filter, and a plethora of differently-sized replacement air filters are presented for retail purchase. Once again, the relatively large number of differently-sized air filters that must be displayed occupies valuable retail shelf space, and a potential purchaser will oftentimes be unsure as to which size is a best "fit" at the time of purchase.

SUMMARY

The inventors of the present disclosure recognize that a need exists for an air filter that overcomes one or more of the above-mentioned problems.

Some aspects of the present disclosure relate to an air filter device including an air filter unit and an expansion unit. The air filter unit includes a filter media assembly maintained by an outer frame assembly. The outer frame assembly defines exterior length, width and depth dimensions of the air filter device in an initial state. The expansion unit provides one or more of an expanded length, width or depth in an expanded state of the air filter device. In some embodiments, portions or an entirety of the expansion unit is provided apart from the air filter unit in a deliver condition of the air filter device (e.g., the air filter device can be provided in kit form to a user). In other embodiments, portions or an entirety of the expansion unit is assembled to the air filter unit prior to delivery to a user. Regardless, the air filter devices of the present disclosure are useful with a wide variety of differently size air handling devices, able to readily fit and seal with a compartment of the air handling device via the expansion unit.

BRIEF DESCRIPTION OF THE DRAWINGS

FIG. 3A is a perspective view of a filter media assembly useful with the air filter device of FIG. 1A;

FIG. 3B is a side view of a portion of the filter media assembly of FIG. 3A;

FIG. 7A is a perspective view of an air filter device in accordance with principles of the present disclosure;

FIG. 7B is an enlarged view of a portion of the air filter device of FIG. 7A;

DETAILED DESCRIPTION

Figure 1:
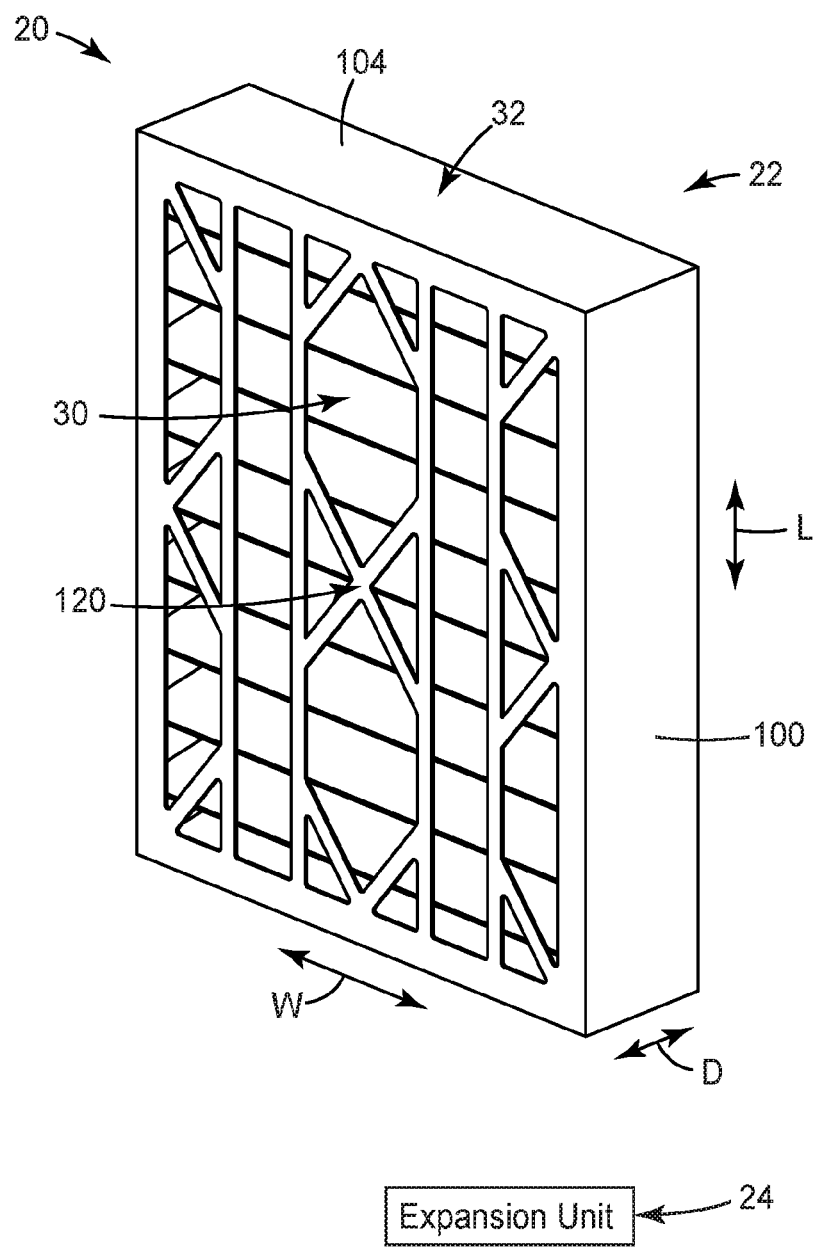
FIG. 1 a perspective view of an air filter device in accordance with principles of the present disclosure, including portions shown in block form.
Figure 2A:
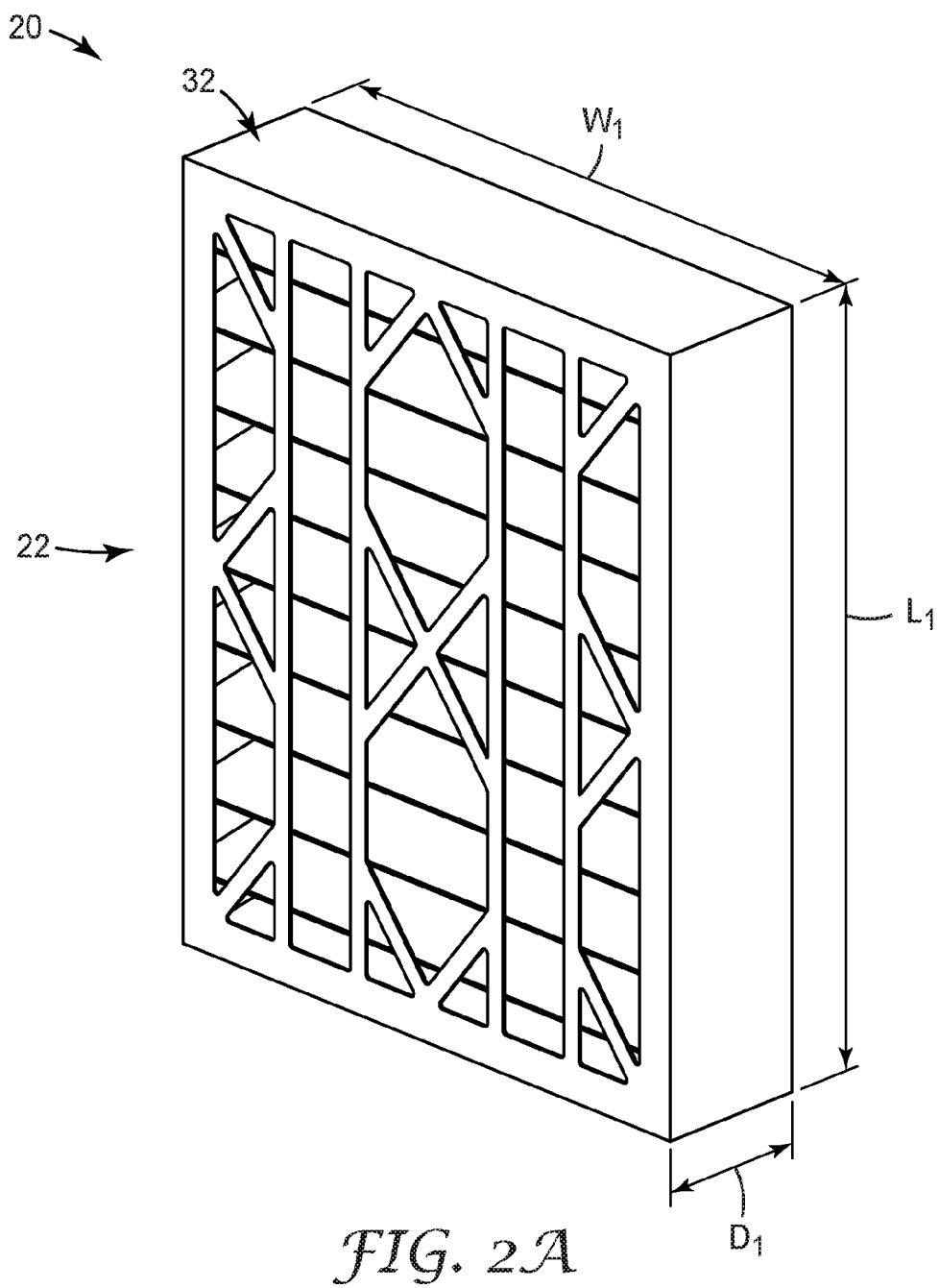
FIG. 2A is a perspective view of the air filter device of FIG. 1 in an initial state.
Figure 2D:
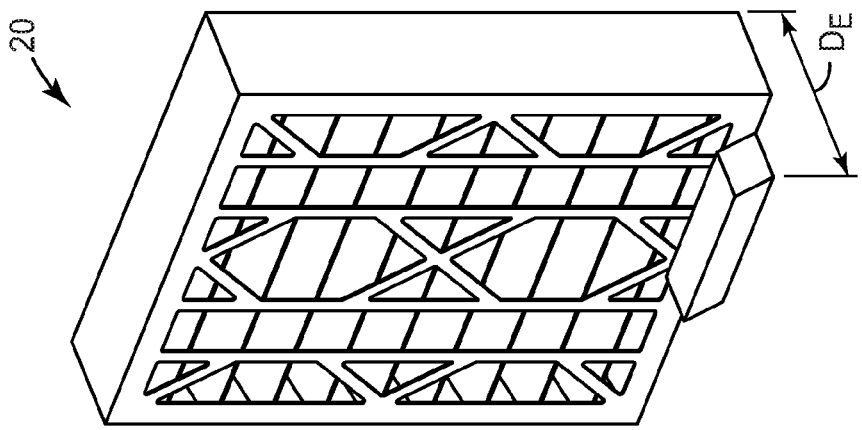
FIGS. 2B-2D are perspective views of the air filter device of FIG. 1 in various expanded states.
Figure 2C:
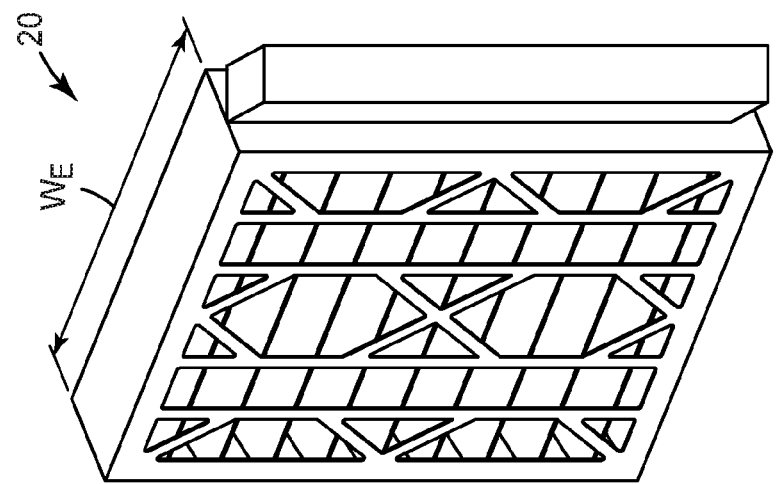
Figure 2B:
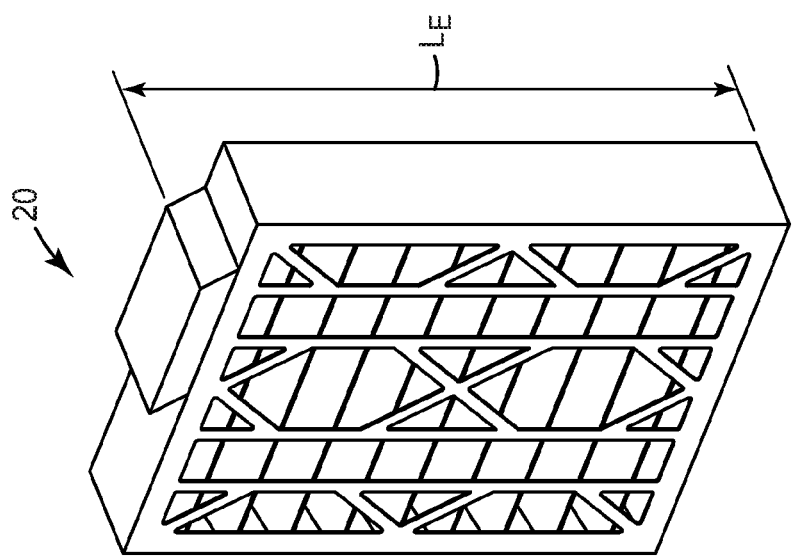

Aspects of the present disclosure relate to air filter devices that readily fit, and achieve a desired seal within, differently-sized air handling compartments. One embodiment of an air filter device 20 in accordance with principles of the present disclosure is shown in FIG. 1 and includes an air filter unit 22 and an expansion unit 24 (shown in block form). The air filter unit 22 can be akin to any conventional or known air filter (e.g., HVAC air filter), and includes a filter media assembly 30 and an outer frame assembly 32 as described below. The outer frame assembly 32 can establish exterior dimensions of the air filter unit 22, including exterior dimensions in length L, width W, and depth D directions. The expansion unit 24 can assume a wide variety of forms as described below, and generally serves to selectively increase a footprint or size of the air filter unit 22 in one or more of the length L, width W and depth D directions. The air filter device 20 is generally constructed to have an initial state as initially provided to a user in which some or all of the expansion unit 24 is separate from the air filter unit 22, or, if connected to the air filter unit 22 in the initial state, the expansion unit 24 (or corresponding portions thereof) is retracted so as to not overtly extend outside the footprint established by the outer frame assembly 32. FIG. 2A is a non-limiting example of the initial state of the air filter device 20 in which a portion or entirety of the expansion unit 24 (FIG. 1) is apart from the air filter unit 22, and the air filter unit 22 alone (or with the optional portion of the expansion unit 24 in a retracted arrangement) serves as the air filter device 20 for installation to an air handling system (not shown). In the initial state, then, the air filter device 20 has length $L_I$, width $W_I$ and depth $D_I$ dimensions as dictated by the air filter unit 22, for example by the outer frame assembly 32. Where desired by a user, the expansion unit 24 can be installed and/or deployed relative to the air filter unit 22, to generate an expanded state of the air filter device 20. The air filter device 20 can be installed to an air handling system in the expanded state (and/or be caused to transition to the expanded state following installation). As generally reflected by the non-limiting example expanded states of FIGS. 2B-2D, the expanded state of the air filter device 20 of the present disclosure can include an expanded length $L_E$ (FIG. 2B), an expanded width $W_E$ (FIG. 2C) and/or an expanded depth $D_E$ (FIG. 2D) that is greater than the corresponding dimension $L_I$, $W_I$, $D_I$ in the initial state.

Returning to FIG. 1, in some embodiments, the air filter unit 22 is sized for installation to a conventional HVAC system, with at least the outer frame assembly 32 supporting the filter media assembly 30 in the presence of HVAC system airflow. With these non-limiting constructions, depending upon a size of the air filter compartment provided with the HVAC system, a user can install the air filter unit 22 alone (i.e., the air filter device 20 in the initial state as described above), or can utilize the expansion unit 24 to expand the air filter device 20 in one or more directions to better match an actual size of the air filter compartment, better ensuring a desired seal is achieved between the air filter device 20 and framework of the compartment.

With embodiments in which the initial state of the air filter device 20 includes a portion or an entirety of the expansion unit 24 not directly attached or connected to the air filter unit 22, the air filter device 20 can optionally be provided to a user in kit form. For example, the air filter unit 22 and the expansion unit 24 can be commonly packaged within a container or other packaging, optionally with one or more additional items such as written instructions for use. The packaging can assume any useful format, for example packaging useful for retail display and sale.

Air Filter Unit

The air filter unit 22 can assume various forms, and can include the filter media assembly 30 and the outer frame assembly 32. The filter media assembly 30 can assume a wide variety of forms useful for air filtration, such as HVAC air filtration, presently known, or in the future developed. In some embodiments, the filter media assembly 30 is a pleated filter media assembly. By "pleated" is meant a web at least a portion of which has been folded to form a configuration comprising rows of generally parallel, oppositely oriented folds. For example, and as shown in FIGS. 3A and 3B, a pleated version of the filter media assembly 30 includes a plurality of pleats 40 each including a fold line 42 defining a pleat tip 44 and a pair of adjacent panels 46.

The pleated version of the filter media assembly 30 can consist of a pleated filter media or web 60 alone (as in the illustrated embodiment), or can include one or more additional components or structures applied or assembled to a pleated filter media 60. The pleated filter media 60 of the assembly 30 can be self-supporting or non-self-supporting. As used herein, the term "self-supporting filter media or web" can describe at least one of the following conditions: (1) a filter media or web that is deformation resistant without requiring stiffening layers, adhesive or other reinforcement in the filter media web; or (2) the filter media generally maintains its shape when subjected to an airstream as described, for example, in U.S. Pat. No. 7,169,202 to Kubokawa, the entire teachings of which are incorporated herein by reference; or (3) a web or media having sufficient coherency and strength so as to be drapable and handleable without substantial tearing or rupture. As used herein, the term "non-self-supporting" can denote an air filter media that is not capable, in the absence of a support frame and/or a support grill, of withstanding the forces encountered due to typical air flow. For example, where the pleated version of the filter media assembly 30 consists of the pleated filter media 60 alone, the pleated filter media or web 60 can be self-supporting or non-self-supporting. Where the pleated version of the filter media assembly 30 consists of the pleated filter media or web 60 and a support structure, the pleated filter media 60 can be non-self-supporting with the additional supporting structure rendering the pleated filter media assembly 30, as a whole, to be self-supporting.

The particular filter media 60 selected for the pleated version of the filter media assembly 30 is not critical to the present disclosure so long as the resultant pleated filter media assembly 30 (whether consisting solely of the pleated filter media 60 alone or with additional structures applied thereto) has the desired characteristics described herein. The filter media 60 can be constructed, for example, from nonwoven fibrous media formed of thermoplastics or thermosetting materials such as polypropylene, linear polyethylene and polyvinyl chloride. Other suitable, non-limiting materials for the filter media include porous foams, nonwovens, papers, fiberglass, or the like. The filter media assembly 30 can optionally include a highly open wire mesh or screen, one or more adhesive strands, etc., that is bonded to the filter media 60 in order to enhance the pleatability thereof and that is pleated along with the filter media 60 itself. The wire mesh or screen (or other additional component) may impede re-collapsing of the pleated version of the filter media assembly 30. In other embodiments, the pleated version of the filter media assembly 30 can incorporate wire-supported pleats, self-supported mini-pleats, or other pleat constructions currently available or in the future developed.

In some embodiments, the filter media 60 comprises a nonwoven web that can have random fiber arrangement and generally isotropic in-plane physical properties (e.g., tensile strength), or if desired may have aligned fiber construction (e.g., one in which the fibers are aligned in the machine direction as described in U.S. Pat. No. 6,858,297 to Shah et al., the teachings of which are incorporated herein by reference) and anisotropic in-plane physical properties. Some or all of the fibers comprising the nonwoven webs useful with the filter media 60 can be multicomponent fibers having at least a first region and a second region, where the first region has a melting temperature lower than the second region. Some suitable multicomponent fibers are described, for example, in U.S. Pat. Nos. 7,695,660, 6,057,256, 5,597,645, 5,972,808, 5,662,728 and 5,486,410 the teachings of each of which are incorporated herein by reference in their entireties.

Other nonwoven webs useful with the filter media 60 can be a high loft spunbond web, such as described, for example, in U.S. Pat. No. 8,162,153 to Fox et al., the entire teachings of which are incorporated herein by reference. In other embodiments, the filter media 60 can be a low loft spunbond web, such as those described in U.S. Pat. No. 7,947,142 to Fox et al., the entire teachings of which are incorporated herein by reference. In yet other embodiments, nonwoven webs useful with the filter media 60 are generated by other techniques and/or have other characteristics, such as the meltblown nonwoven webs disclosed in U.S. Pat. No. 6,858,297 to Shah et al. (mentioned above). Other non-limiting example of useful nonwoven web formats include bi-modal fiber diameter meltblown media such as that described in U.S. Pat. No. 7,858,163, the entire teaching of which are incorporated herein by reference.

In some embodiments, an electrostatic charge is optionally imparted into or on to material(s) of the filter media 60. Thus, the filter media 60 can be an electret nonwoven web. Electric charge can be imparted to the filter media 60 in a variety of ways as is well known in the art, for example by hydrocharging, corona charging, etc. (e.g., as described in U.S. Pat. No. 7,947,142 (mentioned above)). In other embodiments, the filter media 60 is not electrostatically charged.

The optional pleats can be formed in the filter media 60 (or in the pleated filter media assembly 30) using various methods and components as are well known in the art, e.g., to form a pleated filter for use in applications such as air filtration, for example those described in U.S. Pat. No. 6,740,137 to Kubokawa et al. and U.S. Pat. No. 7,622,063 to Sundet et al., the entire teachings of both of which are incorporated herein by reference.

With pleated versions of the filter media assembly 30, a variety of pleat depths D can be incorporated. In some embodiments, the pleated filter media assembly 30 has a pleat depth D of at least about 4 inches, optionally not less than 4 inches (e.g., a "deep pleat" pleated filter media). Other depths, greater or smaller, are also acceptable.

In other embodiments of the present disclosure, portions or all of the filter media assembly 30 need not have a pleated construction.

Regardless of an exact construction, the filter media assembly 30 defines opposing, first and second major faces 70, 72 (referenced generally in FIGS. 3A and 3B). Further, a perimeter of the filter media assembly can be defined by opposing, first and second side edges 80, 82, and opposing, first and second end edges 84, 86. In some embodiments, the perimeter can have the rectangular shape (that is specifically inclusive of a square shape) shown.

Returning to FIG. 1, the outer frame assembly 32 can assume a variety of forms and is generally configured to surround the perimeter of the filter media assembly 30. Further, the outer frame assembly 32 is constructed to robustly support the filter media assembly 30 in the initial state as well as in any of the expanded states described below, including the outer frame assembly 32 rigidly maintaining the established length $L_I$, width $W_I$, and depth $D_I$ (FIG. 2A) dimensions when subjected to expected forces of a designated end-use environment (e.g., the outer frame assembly 32 will maintain its structural integrity with installation to an HVAC system air filter compartment and subjecting the air filter device 20 to normal HVAC system airflow). With this in mind, the outer frame assembly 32 includes or defines opposing, first and second side frame structures 100 (one of which is visible in FIG. 1) and opposing, first and second end frame structures 104 (one of which is visible in FIG. 1). The side frame structures 100 are generally configured to cover a respective one of the first and second side edges 80, 82 (FIG. 3A) of the filter media assembly 30, whereas the end frame structures 104 are generally configured to cover a respective one of the first and second end edges 84, 68 (FIG. 3A).

The frame structures 100, 104 can have any format conducive to use as part of the outer frame assembly 32, and in some embodiments can be substantially identical. For example, in some embodiments, one or more or all of the frame structures 100, 104 can consist of a single frame member or body. In other embodiments, one or more or all of the frame structures 100, 104 can include two or more frame members that connected to another (e.g., slidably connected).

The outer frame assembly 32 can be formed from a variety of materials capable of maintaining their structural integrity in the presence of expected forces. For example, the outer frame assembly 32 can be constructed of cardboard, paperboard, plastic, metal, etc. In some embodiments, the outer frame assembly 32 integrally forms the side and end frame structures 100, 104. Thus, in some embodiments a major portion of the outer frame assembly 32 may be conveniently formed by the folding of a suitable precursor material (e.g., paperboard) along fold lines so as to provide the side and end frame structures 100, 104. However, any suitable frame construction may be used; i.e. any major portion of the outer frame assembly 32 may be made of any suitable material (whether paperboard, plastic, etc.) and may be formed e.g. by folding of a single frame piece, by the assembling of multiple pieces to each other, and so on. In many embodiments, all four major frame structures 100, 104 may each comprise upstream and downstream flanges and inner and outer sidewalls/panels and foldable connections there between.

In some embodiments, the air filter unit 22 can further include one or more grid or grill structures extending over a corresponding one of the major faces 70, 72 (FIGS. 3A and 3B) of the filter media assembly 30. For example, FIG. 1 illustrates a grid or grill 120 projecting from the outer frame assembly 32 and extending over the first major face 70 (best identified in FIG. 3B) of the filter media assembly 30. The pattern reflected by FIG. 1 for the grid or grill 120 is but one acceptable configuration. The air filter unit 22 can optionally include an additional grill or grid structure (not shown) overlying the second major face 72 (hidden in FIG. 1, but identified, for example, in FIG. 3B) of the filter media assembly 30. Regardless, the grill(s) or grid(s) 120 can be formed of a material similar to that of the outer frame assembly 32. In some embodiments, the grill(s) or grid(s) 120 can be integrally formed with, and folded relative to, the outer frame assembly 32. In other embodiments, the grill(s) or grid(s) (or sub-components thereof) can be separately formed and subsequently attached to the outer frame assembly 32.

Expansion Unit

The expansion unit 24 can assume a variety of forms compatible with the particular format of the air filter unit 22. One or more portions of, or an entirety of, the expansion unit 24 can be provided as component of (e.g., pre-assembled to) the air filter unit 22; in other embodiments, an entirety of the expansion unit 24 can be provided apart from the air filter unit 22 and subsequently assembled thereto by a user. Various examples of expansion units in accordance with principles of the present disclosure are described below. While described separately, portions or an entirety of one example expansion unit can be combined with portions or an entirety of another example expansion unit.

Figure 4A:
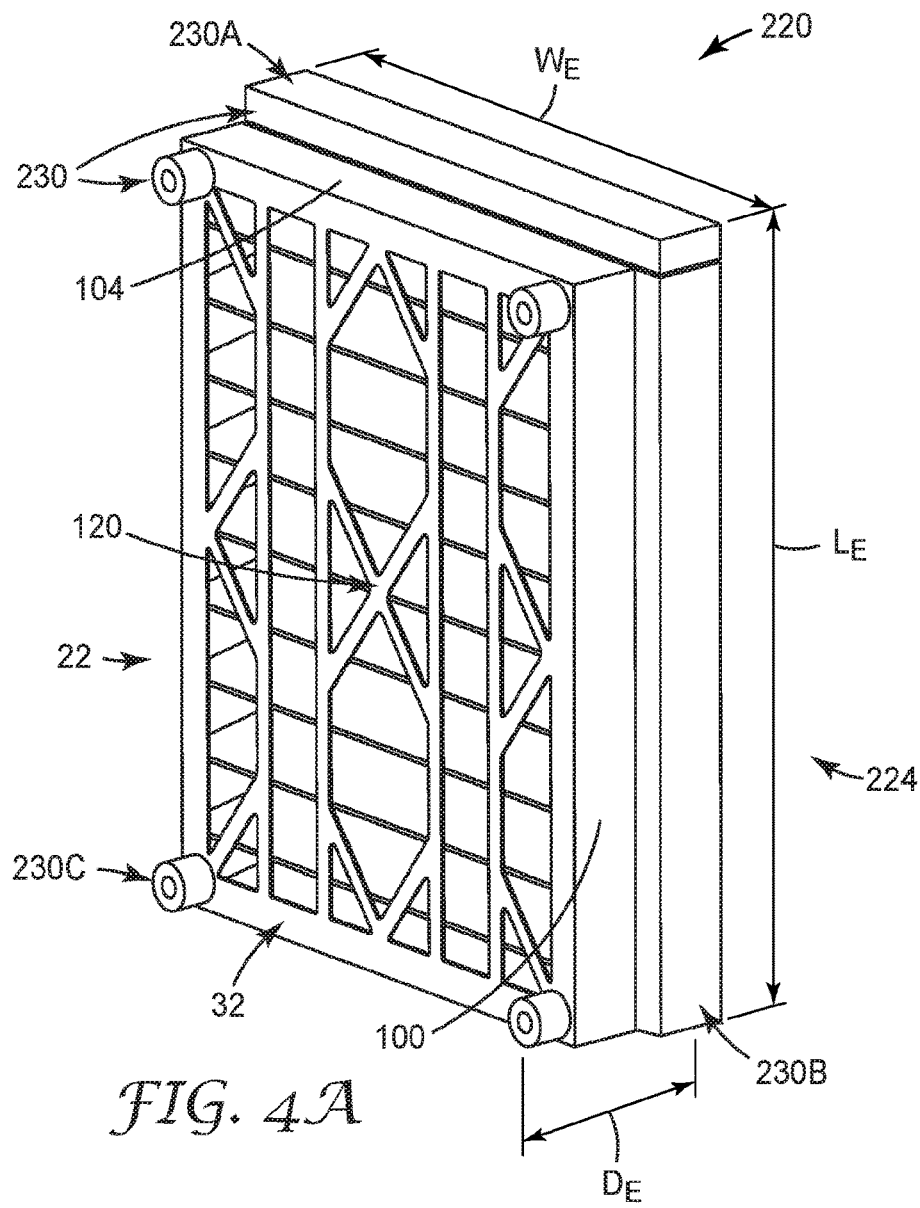
FIG. 4A is a perspective view of an air filter device in accordance with principles of the present disclosure.
Figure 4B:
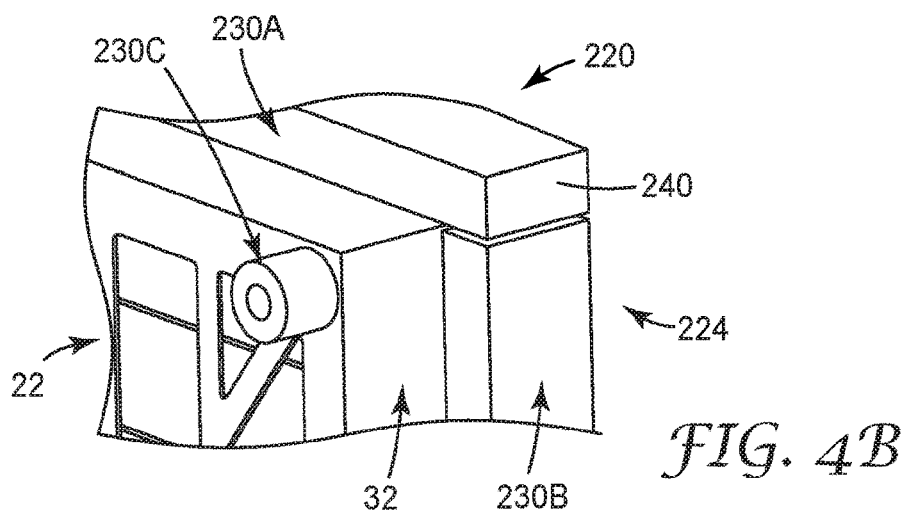
FIG. 4B is an enlarged view of a portion of the air filter device of FIG. 4A.

An air filter device 220 including an example expansion unit 224 (referenced generally) in accordance with principles of the present disclosure applied to the air filter unit 22 is shown in FIGS. 4A and 4B. As a point of reference, FIGS. 4A and 4B reflect a possible installation condition of the air filter device 220 in which the expansion unit 224 (or portions thereof) has been mounted to the air filter unit 22. Conversely, a possible delivery condition (not shown) of the air filter device 220 includes the expansion unit 224 not yet mounted to the air filter unit 22 (e.g., a user can receive the air filter device 220 in the delivery condition, and then mount the expansion unit 224 (or portions thereof) to the air filter unit 22 in achieving the possible installation condition).

The expansion unit 224 includes one or more standoffs 230. The standoffs 230 are generally sized and shaped for mounting to a designated region of the air filter unit 22, and can include one or more of a length standoff 230A, a width standoff 230B, and a depth standoff 230C. The length standoff 230A is generally sized and shaped for mounting to one of the end frame structures 104 to effectuate an expanded state length $L_E$ that is greater than the initial state length $L_I$ (FIG. 1). The width standoff 230B is generally sized and shaped for mounting to one of the side frame structures 100 to effectuate an expanded state width $W_E$ in the air filter device that is greater than the initial state width $W_I$ (FIG. 1). Finally, the depth standoff 230C is generally sized and shaped for mounting to outer frame assembly 32 or other component of the air filter unit 22 at a location that does not overtly impede airflow through the air filter unit 22 (e.g., at a corner formed by two of the frame structures 100, 104, on the grill or grid 120, etc.) to effectuate an expanded state depth $D_E$ that is greater than the initial state depth $D_I$ (FIG. 1). In some embodiments, the expansion unit 224 as provided to a user in the delivery condition mentioned above can include one (or more) of the length standoff 230A, one (or more) of the width standoff 230B, and a plurality of the depth standoffs 230C. In other embodiments, the expansion unit 224 as provided to a user in the delivery condition can include less than all of the length standoff 230A, the width standoff 230B and/or the depth standoffs 230C (e.g., the expansion unit can include only the depth standoffs 230C).

Each of the standoffs 230 can have a similar construction, for example including a standoff body 240 (identified, for example, for the length standoff 230A in FIG. 4B). In some embodiments, the standoff body 240 can be formed of a light weight, resilient, at least slightly compressible material capable of maintaining a designated shape when subjected to compression. For example, the standoff body 240 can be a foam material (e.g., open or closed cell foams, natural foams, synthetic foams, etc.). Other materials, such as rubber, plastic, etc., are also envisioned. In some embodiments, the standoff body 240 associated with each of the standoffs 230A-230C is a pre-cut foam strip (e.g., as with the standoffs 230A, 230B) or block (e.g., a cylindrical block as with the standoffs 230C), sized and shaped in accordance with geometries of the corresponding air filter unit 22 as described above.

Each of the standoffs 230 can further be configured to promote mounting thereof to the air filter unit 22 by a user. For example, a face of the standoff body 240 can carry (e.g., be coated with) an adhesive formulated to achieve a bond between the standoff body 240 and a corresponding portion of the air filter unit 22 (e.g., where the outer frame assembly 32 is a paperboard material, the selected adhesive can be formulated to achieve a bond with paperboard). As initially provided to a user (e.g., as part of a kit in which the standoff(s) 230 are provided to a user apart from the air filter unit 22), a release liner can further be included, temporarily covering the adhesive. When the user is ready to mount the standoff 230 to the air filter unit 22, the release liner is removed thereby exposing the adhesive. In other embodiments, one or more adhesive strips (not shown) can be provided on the outer frame assembly 32 (or other exterior components of the air filter unit 22) at location(s) corresponding with potential application of a standoff 230; under these circumstances, the adhesive strip(s) can be temporarily covered by a release liner that is removed prior to mounting of the corresponding standoff 230. In yet other embodiments, a strip of double sided tape (that may be provided to the user as part of the expansion unit 224) can be employed to secure the standoff(s) 230 to the air filter unit 22. Other configurations that facilitate mounting of the standoff 230 to the air filter unit 22 are also acceptable (e.g., a mechanical fastener, hook-and-loop fasteners, etc.).

During use, the air filter device 220 is initially provided to a user in an initial state in which the air filter unit 22 is separated from the expansion unit 224. For example, the air filter unit 22 and the expansion unit 224 can be provided to a user in a common packaging, with none of the standoffs 230 mounted to the air filter unit 22. Alternatively, a user can obtain (e.g., purchase) the air filter unit 22 and the expansion unit 224 separately. Regardless, the user then evaluates (e.g., visually estimates) dimensions of the air filter compartment (not shown) to which the air filter device 220 will be installed. In some instances, dimensions of the air filter unit 22 will closely correspond to the dimensions of the air filter compartment. Under these circumstances, the air filter unit 22 alone can be installed to the air filter compartment (e.g., the air filter unit 22 serves as the installed air filter device 220). In other instances, the user may determine that one or more of the length $L_I$, width $W_I$ and/or depth $D_I$ (FIG. 2A) dimension of the air filter unit 22 is appreciably less (e.g., 10% less) than the corresponding dimension of the air filter compartment. Under these circumstances, the user can select and mount one or more of the standoffs 230 to air filter unit 22, effectuating a desired increase in the corresponding dimension. For example, if it is determined that the depth $D_I$ of the air filter unit 22 is appreciable less than the depth dimension of the air filter compartment, one or more of the depth standoffs 230C can be mounted to the air filter unit 22 as shown, for example, in FIG. 4A. Additionally or alternatively, the length standoff 230A can be selected and mounted to the air filter unit 22 to effectuate an increased or expanded length $L_E$, and the width standoff 230B can be selected to the air filter unit 22 to effectuate an increased or expanded width $W_E$. It will be understood that for a particular air filter compartment installation, less than all of the standoffs 230A-230C may be required. Once the selected standoff(s) 230 have been mounted to the air filter unit 22 so as to transition the air filter device 220 to an expanded state, the air filter device 220 can be installed to the air filter compartment, with the mounted standoff(s) 230 bearing against framework of the air filter compartment and promoting a seal between the air filter device 220 and the air filter compartment.

Figure 5A:
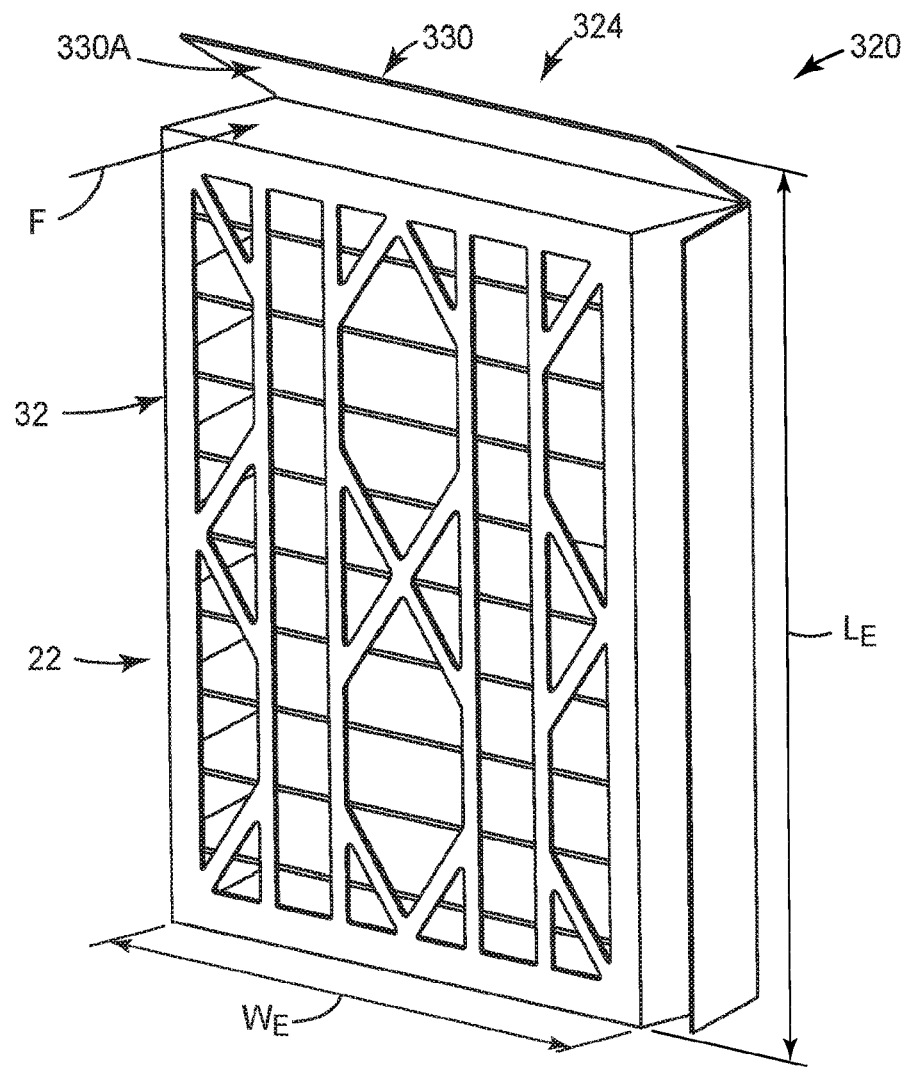
FIG. 5A is a perspective view of an air filter device in accordance with principles of the present disclosure.
Figure 5B:
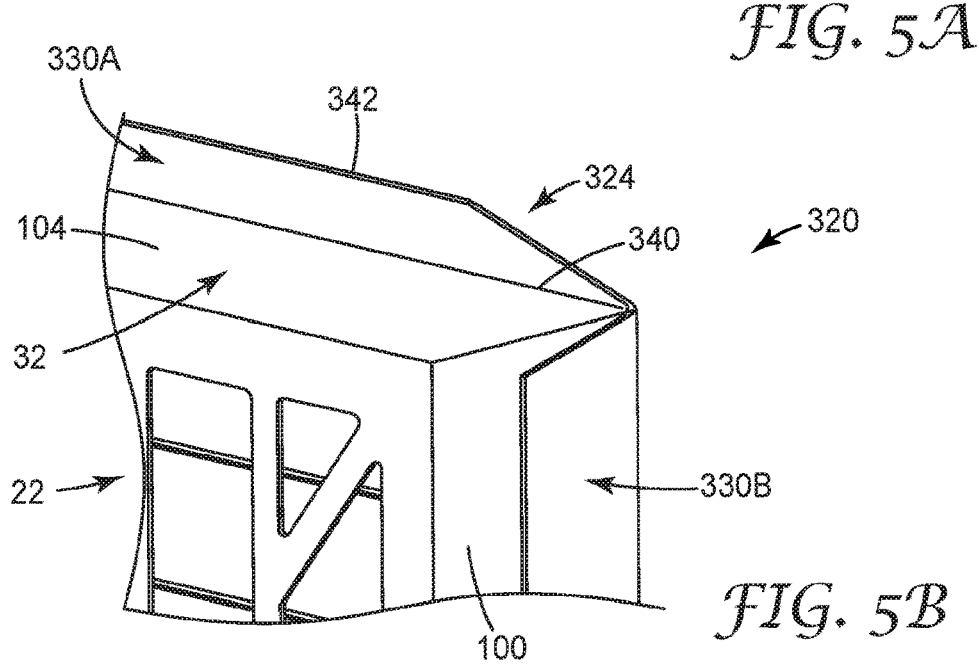
FIG. 5B is an enlarged view of a portion of the air filter device of FIG. 5A.

Another air filter device 320 including an example expansion unit 324 (referenced generally) in accordance with principles of the present disclosure applied to the air filter unit 22 is shown in FIGS. 5A and 5B. As a point of reference, FIGS. 5A and 5B reflect a possible installation condition of the air filter device 320 in which the expansion unit 324 (or portions thereof) has been mounted to the air filter unit 22. Conversely, a possible delivery condition (not shown) of the air filter device 320 includes the expansion unit 324 not yet mounted to the air filter unit 22 (e.g., a user can receive the air filter device 320 in the delivery condition, and then mount the expansion unit 324 (or portions thereof) to the air filter unit 22 in achieving the possible installation condition). In yet other embodiments, the delivery condition of the air filter device 320 includes the expansion unit 324 (or portions thereof) pre-assembled to (or integrally formed by) the air filter unit 22. With some of these embodiments, the pre-assembled expansion unit 324 (or portions thereof) is configured to self-deploy to the expanded condition reflected by FIGS. 5A and 5B in the presence of airflow as described below.

The expansion unit 324 includes one or more flanges 330. The flanges 330 are generally sized and shaped in accordance with a designated region of the air filter unit 22, and can include one or more of a length flange 330A and one or more of a width flange 330B. The length flange 330A is generally sized and shaped in accordance with dimensions of one of the end frame structures 104 to effectuate an expanded state length $L_E$ that is greater than the initial state length $L_I$ (FIG. 1). The width flange 330B is generally sized and shaped in accordance with dimensions of one of the side frame structures 100, 102 to effectuate an expanded state width $W_E$ that is greater than the initial state width $W_I$ (FIG. 1). In some embodiments, the expansion unit 324 can include both of the length and width flanges 330A, 330B; in other embodiments, the expansion unit 324 includes only the length flange 330A or only the width flange 330B.

Apart from dimensions, each of the flanges 330 can have a similar construction. For example, and as identified for the length flange 330A in FIG. 5B, each of the flanges 330 can be a lightweight yet relative stiff material defining a fixed end 340 opposite a free end 342. The fixed end 340 can be connected to, or is configured for connection to by a user, the corresponding frame structure of the air filter unit 22 (e.g., the fixed end 340 of the length flange 330A is connected to the fend frame structure 104) in a manner permitting pivoting movement at the point or line of connection. The flange 330 projects away from the fixed end 340, terminating at the free end 342 that is otherwise free of direct connection or attachment to the air filter unit 22. For example, in some embodiments the flange 330 is a paperboard body integrally formed with the outer frame assembly 32, with a fold line being formed at the line of interface between the flange 330 and the corresponding frame structure 100, 104 of the outer frame assembly 32 to define the fixed end 340.

With embodiments in which the air filter device 320 is provided to a user with the flange(s) 330 pre-assembled to (e.g., integrally formed with) the air filter unit 22, the user installs the air filter device 320 (including the flange(s) 330) to the air filter compartment (not shown). With embodiments in which the air filter device 320 is provided to a user with the flange(s) 330 uncoupled from the air filter unit 22, the user can first compare an estimated size of the air filter compartment with the length and width $L_I$, $W_I$ dimensions of the air filter unit 22. Based on this comparison, one or both of the flanges 330A, 330B can be mounted to the air filter unit 22 as described above, with the so-configured air filter device 320 then being installed to the air filter compartment. In either instance, the air filter device 320 can be installed such that the free end 342 of the flange(s) 330 faces the upstream direction of airflow through the air filter compartment. During operation of the air handling device, airflow (designated by arrow F in FIG. 5A) will interface between the flange(s) 330 and the outer frame assembly 32, forcing the flange(s) 330 to extend outwardly relative to the outer frame assembly 32 (e.g., the flange(s) 330 is caused to pivot relative to the outer frame assembly 32 at the fixed end 340, with the corresponding free end 342 moving outwardly away from the outer frame assembly 32). In this expanded state, the flange(s) 330 can be brought into contact with framework of the air filter compartment, promoting a seal between the air filter device 320 and the air filter compartment.

Figure 6A:
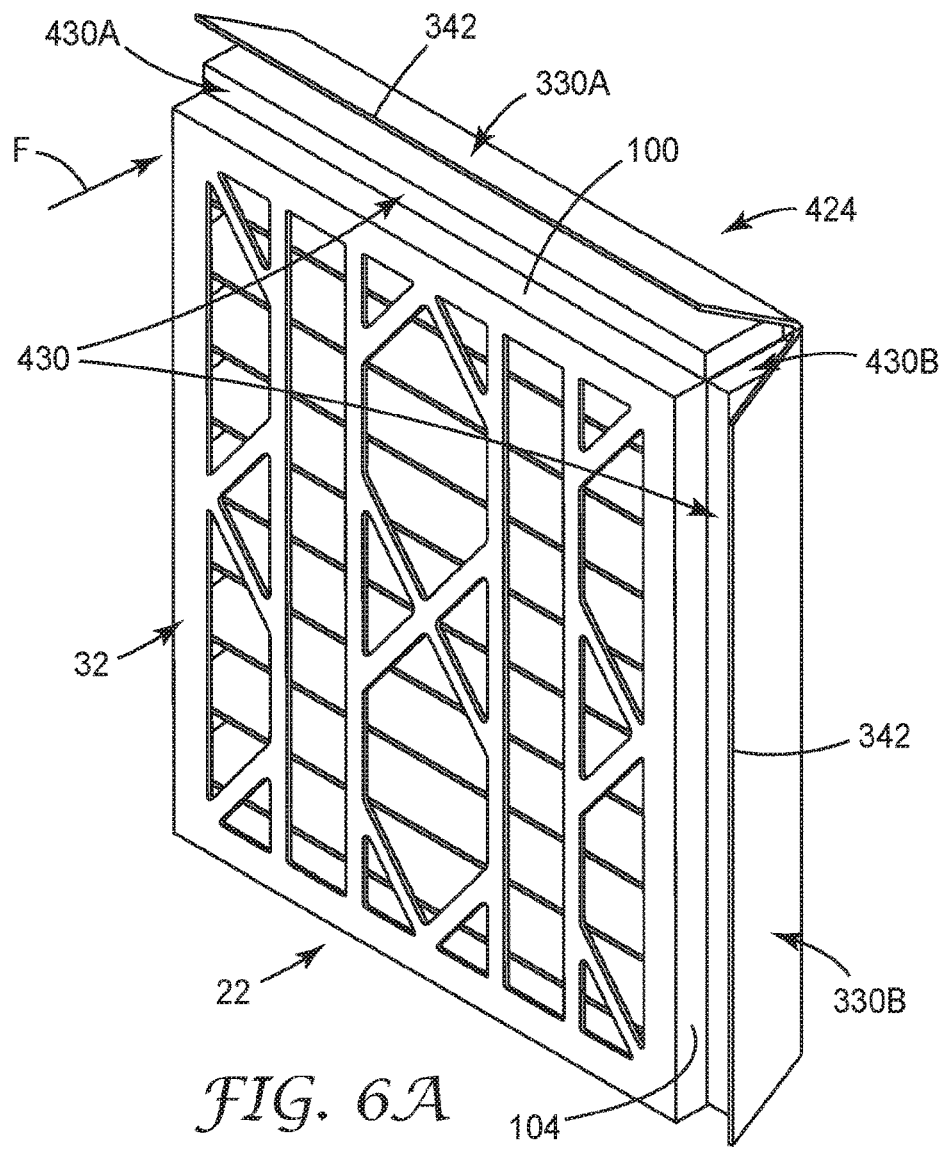
FIG. 6A is a perspective view of an air filter device in accordance with principles of the present disclosure.
Figure 6B:
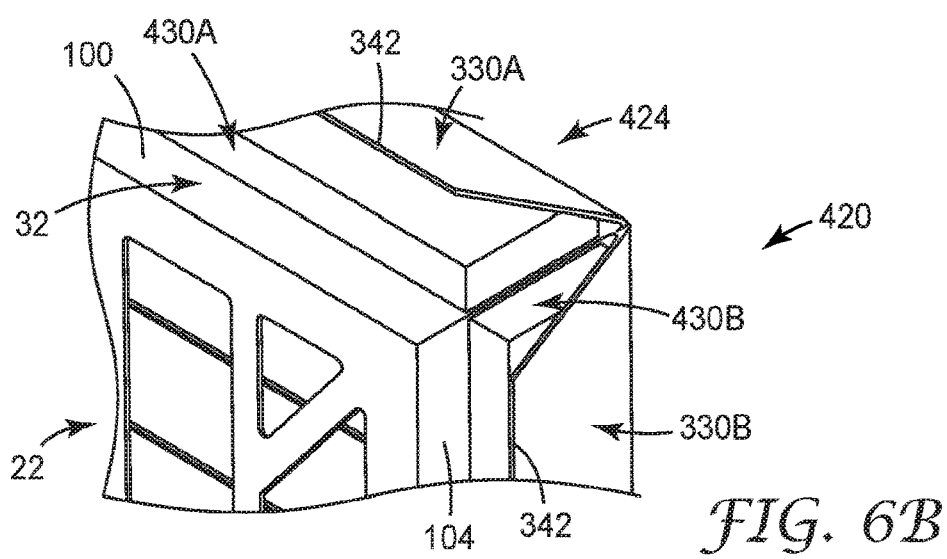
FIG. 6B is an enlarged view of a portion of the air filter device of FIG. 6A.

Another air filter device 420 including an example expansion unit 424 (referenced generally) in accordance with principles of the present disclosure applied to the air filter unit 22 is shown in FIGS. 6A and 6B. As a point of reference, FIGS. 6A and 6B reflect a possible installation condition of the air filter device 420 in which the expansion unit 424 (or portions thereof) has been mounted to the air filter unit 22. Conversely, a possible delivery condition (not shown) of the air filter device 420 includes the expansion unit 424 (or portions thereof) not yet mounted to the air filter unit 22 (e.g., a user can receive the air filter device 420 in the delivery condition, and then mount the expansion unit 424 (or portions thereof) to the air filter unit 22 in achieving the possible installation condition). In yet other embodiments, the delivery condition of the air filter device 420 includes the expansion unit 424 (or portions thereof) pre-assembled to (or integrally formed by) the air filter unit 22. With some of these embodiments, the pre-assembled expansion unit 424 (or portions thereof) is configured to self-deploy to the expanded condition reflected by FIGS. 6A and 6B, optionally in the presence of airflow as described below.

The expansion unit 424 can be akin to the expansion unit 324 (FIGS. 5A and 5B) described above, and includes one or more the flanges 330 (e.g., the length flange 330A and the width flange 330B). In addition, the expansion unit 424 includes one or more deflection bodies 430 associated with a corresponding one of the flanges 330 (e.g., with the non-limiting example of FIGS. 6A and 6B, the expansion unit 424 includes a first deflection body 430A corresponding with the length flange 330A and a second deflection body 430B corresponding with the width flange 330B). Apart from dimensions, each of the deflection bodies 430 can have a similar construction. For example, each of the deflection bodies 430 can be formed of a light weight, resilient, at least slightly compressible material capable of maintaining a designated shape when subjected to compression. In some embodiments, the deflection bodies 430 can be a foam material (e.g., open or closed cell foams, natural foams, synthetic foams, etc.). Other materials, such as rubber, plastic, etc., are also envisioned. In some embodiments, the deflection bodies 430 can each be a pre-cut foam strip, sized and shaped in accordance with geometries of the corresponding air filter unit 22 components (e.g., the first deflection body 430A is pre-cut to a size and shape corresponding with dimensions of one of the end frame structures 104; the second deflection body 430B is pre-cut to a size and shape corresponding with dimensions of one of the side frame structures 100).

In some embodiments, the air filter device 420 is provided to a user with the deflection bodies 430 pre-assembled to the air filter unit 22. In other embodiments, the delivery condition of the air filter device 420 can include the deflection bodies 430 apart from the air filter unit 22 (it being recalled that the flanges 330 may or may not be assembled to the air filter unit 22 in the delivery condition). With these configurations, the expansion unit 424 can further include one or more strips of double-sided adhesive tape or other fastening devices (e.g., complimentary strips of hook-and-loop fasteners) that are employed by a user to secure the deflection bodies 430 at the locations shown. Alternatively, the deflection bodies 430 can be coated with an adhesive that is temporarily covered by a release liner, the air filter unit 22 can be coated with an adhesive at desired locations and that are temporarily covered by a release liner, etc.

With embodiments in which the air filter device 420 is provided to a user with the flange(s) 330 and the deflection body/bodies 430 pre-assembled to the air filter unit 22, the user installs the air filter device 420 to the air filter compartment (not shown). With embodiments in which the air filter device 320 is provided to a user with the deflection body/bodies 430 uncoupled from the air filter unit 22, the user can first compare an estimated size of the air filter compartment with the length and width $L_I$, $W_I$ dimensions of the air filter unit 22. Based on this comparison, one or both of the deflection bodies 430A, 430B can be mounted to the air filter unit 22 as described above, with the so-configured air filter device 420 then being installed to the air filter compartment. In either instance, the air filter device 420 can be installed such that the free end 342 of the flange(s) 330A, 330B faces the upstream direction of airflow through the air filter compartment. During operation of the air handling device, airflow (designated by arrow F in FIG. 6A) will progress between each of the flanges 330A, 330B and the outer frame assembly 32, forcing the flange(s) 330 to extend outwardly relative to the outer frame assembly 32 as described above. The deflection body (where provided) 430 biases the corresponding flange 330 such that the free end 342 projects away from the outer frame assembly 32, and prevents the corresponding flange 330A, 330B from collapsing on to the outer frame assembly 32. Once again, in this expanded state, the flange(s) 330A, 330B can be brought into contact with framework of the air filter compartment, promoting a seal between the air filter device 420 and the air filter compartment.

Another air filter device 520 including an example expansion unit 524 (referenced generally) in accordance with principles of the present disclosure applied to the air filter unit 22 is shown in FIGS. 7A and 7B. As a point of reference, FIGS. 7A and 7B reflect a possible installation condition of the air filter device 520 in which the expansion unit 524 (or portions thereof) has been mounted to the air filter unit 22. Conversely, a possible delivery condition (not shown) of the air filter device 520 includes the expansion unit 524 not yet mounted to the air filter unit 22 (e.g., a user can receive the air filter device 520 in the delivery condition, and then mount the expansion unit 524 (or portions thereof) to the air filter unit 22 in achieving the possible installation condition). In yet other embodiments, the delivery condition of the air filter device 520 includes the expansion unit 524 (or portions thereof) pre-assembled to (or integrally formed by) the air filter unit 22. With some of these embodiments, the pre-assembled expansion unit 524 (or portions thereof) is configured to self-deploy to the expanded condition reflected by FIGS. 7A and 7B in the presence of airflow as described below.

The expansion unit 524 includes one or more flanges 530 that can be akin to the flanges 330 (FIG. 5A) described above. The flanges 530 are generally sized and shaped in accordance with a designated region of the air filter unit 22, and can include one or more of a length flange 530A and one or more of a width flange 530B. The length flange 530A is generally sized and shaped in accordance with dimensions of one of the end frame structures 104 to effectuate an expanded state length $L_E$ (not specifically identified in FIGS. 7A and 7B for ease of illustration) that is greater than the initial state length $L_I$ (FIG. 1). The width flange 530B is generally sized and shaped in accordance with dimensions of one of the side frame structures 100 to effectuate an expanded state width $W_E$ (not specifically identified in FIGS. 7A and 7B for ease of illustration) that is greater than the initial state width $W_I$ (FIG. 1). In some embodiments, the expansion unit 524 can include both of the length and width flanges 530A, 530B; in other embodiments, the expansion unit 524 includes only the length flange 530A or only the width flange 530B.

Apart from dimensions, each of the flanges 530 can have a similar construction. For example, each of the flanges 530 can be a lightweight yet relative stiff material. As identified in FIG. 7B for the width flange 530B, each of the flanges 530 can define a fixed end 540 opposite a free end 542. Further, a fold line 544 can be formed intermediate the ends 540, 542. With this construction, the flange 530 can be viewed has having or defining a first portion 546 between the fixed end and the fold line 544, and a second portion 548 between the fold line 544 and the free end 542. The fixed end 540 can be connected to, or is configured for connection to be a user, the corresponding frame structure of the air filter unit 22 (e.g., the fixed end 540 of the width flange 530B is connected to the side frame structure 100) in a manner permitting pivoting movement at the point or line of connection. For example, in some embodiments the flange 530 is a paperboard body integrally formed with the outer frame assembly 32, with a fold line being formed at the line of interface between the flange 530 and the corresponding frame structure 100, 104 of the outer frame assembly 32 to define the fixed end 540 as described above. The fold line 544 arranges the first and second portions 546, 548 in differing spatial orientations. For example, with the non-limiting example of FIGS. 7A and 7B, the second portion 548 extends over or overlaps the first portion 546. Other spatial arrangements are also envisioned, and in other embodiments, two or more fold lines can be formed along the corresponding flange 530.

With embodiments in which the air filter device 520 is provided to a user with the flange(s) 530 pre-assembled to (e.g., integrally formed with) the air filter unit 22 and pre-folded to arrangement shown in FIGS. 7A and 7B, the user installs the air filter device 520 (including the flange(s) 530) to the air filter compartment (not shown). With embodiments in which the air filter device 520 is provided to a user with the flange(s) 530 either uncoupled from the air filter unit 22 or pre-assembled to the air filter unit 22 but not fully folded (e.g., the fold line 544 can be imparted into the flange 530, but the second portion 548 is not completely folded relative to the first portion 546), the user can first compare an estimated size of the air filter compartment with the length and width $L_f$, $W_f$ dimensions of the air filter unit 22. Based on this comparison, one or both of the flanges 530A, 530B can be mounted to the air filter unit 22 as described above and then folded at the corresponding fold line 544 (or, if pre-assembled but not yet folded, the selected flange(s) 530A, 530B can then be folded), with the so-configured air filter device 520 then being installed to the air filter compartment. In either instance, the air filter device 520 can be installed such that the fixed end 540 of the flange(s) 530 is opposite of the upstream direction of airflow through the air filter compartment. During operation of the air handling device, airflow (designated by arrow F in FIG. 7A) will interface between the flange(s) 530 and the outer frame assembly 32, forcing the flange(s) 530 to extend outwardly relative to the outer frame assembly 32 (e.g., the flange(s) 530 is caused to pivot relative to the outer frame assembly 32 at the fixed end 540, with the corresponding free end 542 moving outwardly away from the outer frame assembly 32). In this expanded state, the flange(s) 530 can be forced into contact with framework of the air filter compartment, promoting a seal between the air filter device 520 and the air filter compartment. The folded arrangement of the flange(s) 530 better ensures contact between the free end 542 (and other regions of the flange 530) and the air filter compartment framework.

Figure 8A:
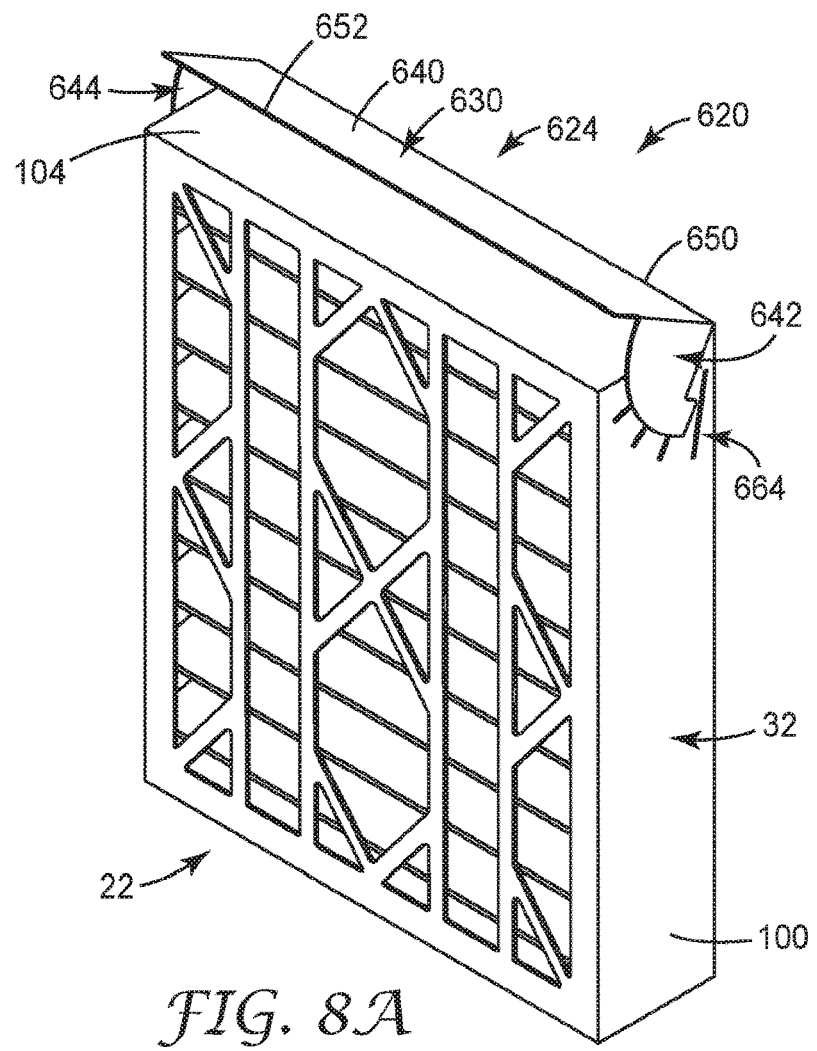
FIG. 8A is a perspective view of an air filter device in accordance with principles of the present disclosure.
Figure 8B:
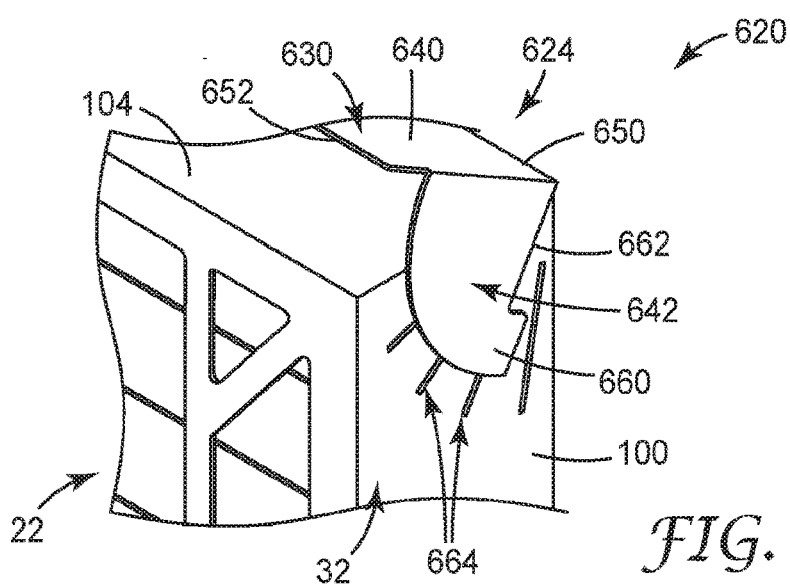
FIG. 8B is an enlarged view of a portion of the air filter device of FIG. 8A.

Another air filter device 620 including an example expansion unit 624 (referenced generally) in accordance with principles of the present disclosure applied to the air filter unit 22 is shown in FIGS. 8A and 8B. As a point of reference, the expansion unit 624 can be pre-assembled to the air filter unit 22 in a delivery condition of the air filter device 620. FIGS. 8A and 8B reflect a possible expanded state of the air filter device 620.

The expansion unit 624 includes at least one flange 630 that can be generally akin to the flanges 330 (FIG. 5A) described above. The flange 630 is generally sized and shaped in accordance with a designated region of the air filter unit 22, such as dimensions of one of the end frame structures 104 or one of the side frame structures 100. For example, FIGS. 8A and 8B illustrate the flange 630 as being associated with the end frame structure 104. Alternatively, the flange 630 can be associated with one of the side frame structures 100. In yet other embodiments, the expansion unit 624 can include two (or more of flanges 630), such as a flange at each of the side frame structures 100, a flange at each of the end frame structures 104, a first flange at one of the side frame structures 100 and a second flange at one of the end frame structures 104, etc.

The flange 630 can include a main panel 640 and locking tabs 642, 644. The main panel 640 is sized and shaped in accordance with dimensions of the corresponding frame structure 100, 104. The locking tabs 642, 644 extend from opposing side edges of the main panel 640. In other embodiments, a single one of the tabs 642 or 644 is included. The main panel 640 defines a fixed end 650 opposite a free end 652. The fixed end 650 can be connected to, or is configured for connection to by a user, the corresponding frame structure of the air filter unit 22 (e.g., the fixed end 650 is connected to the end frame structure 104) in a manner permitting pivoting movement at the point or line of connection. The panel 640 projects away from the fixed end 650, terminating at the free end 652 that is otherwise free of direct connection or attachment to the air filter unit 22. For example, in some embodiments the flange 630 is a paperboard body integrally formed with the outer frame assembly 32, with a fold line being formed at the line of interface between the main panel 640 and the corresponding frame structure 100. 104 of the outer frame assembly 32 to define the fixed end 650, and additional fold lines defining the locking tabs 642, 644 relative to the main panel 640.

The locking tabs 642, 644 are configured to selectively lock the flange 630 relative to the air filter unit 22 at a desired spatial orientation. For example, each of the locking tabs 642, 644 can form or define a tab end 660 projecting from a shoulder 662 as identified for the locking tab 642 in FIG. 8B. The tab end 660 is sized for insertion within one or more locking slots 664 formed in the outer frame assembly 32. Upon insertion, the shoulder 662 bears against a structure of the outer frame assembly 32, with this interface preventing the flange 630 from collapsing on to the outer frame assembly 32. In some embodiments, a plurality of the locking slots 664 are provided, with the locking slots 664 being arranged in a spaced apart manner to provide differing spatial orientations of the flange 630 relative to the outer frame assembly 32, and thus a range of available including spacings between the free end 652 and the outer frame assembly 32. The locking slots 664 can be formed in various manners (e.g., slits, cuts, perforations, etc. through a thickness of the corresponding frame structure of the outer frame assembly 32), and may or may not be complete cuts in the initial state (e.g., to the extent a user desires to employ a selected one of the locking slots 664, the selected locking slot 664 can first be "completed" by the user). Other locking mechanisms or techniques are also acceptable that may or may not entail the locking slots 664; for example, an adhesive can be provided along a face of the locking tabs 642, 644.

Use of the air filter device 620 can include the first comparing an estimated size of the air filter compartment with the length and width $L_I$, $W_I$ (FIG. 2A) dimensions of the air filter unit 22 for which one of the flanges 630 is available (e.g., with the non-limiting example of FIGS. 8A and 8B, the flange 630 is available to affect an expansion in the length direction). Based on this comparison, the flange 630 can be arranged to an expanded state corresponding with the estimated dimension by coupling the locking tabs 642, 644 to the outer frame assembly 32 at a desired location (e.g., the locking tabs 642, 644 are connected to the locking slot 664 appropriate for locating the free end 652 at a spatial position that effectuates an expanded length $L_E$ corresponding with the estimated length of the air filter compartment). The so-configured air filter device 620 can then be installed to the air filter compartment, with the free end 652 contacting framework of the air filter compartment to promote a seal between the air filter device 620 and the framework. In other instances, the comparison may indicate that the air filter unit 22 is appropriately sized for installation to the air filter compartment, in which case the flange 630 is not transitioned to an expanded stated. Instead, the flange 630 can remain collapsed against the outer frame assembly 32 with installation of the air filter device 620 to the air filter compartment.

Figure 9A:
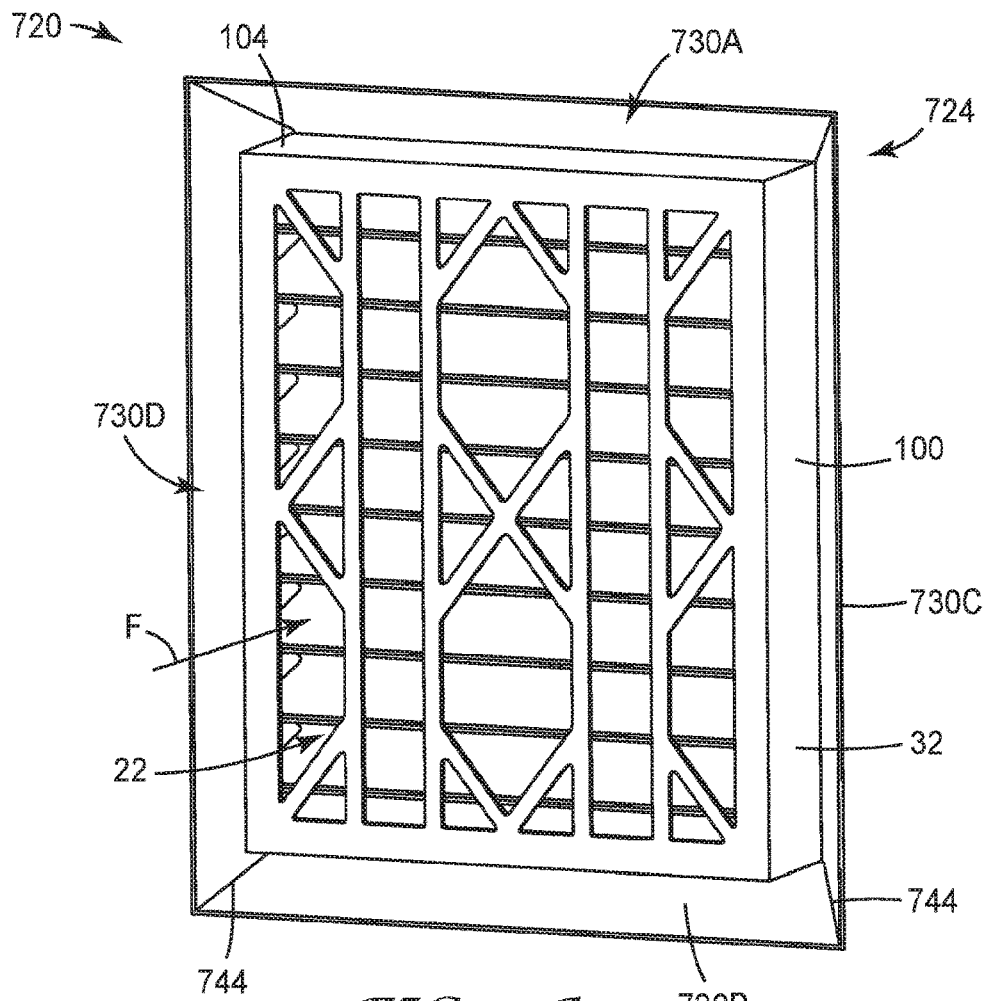
FIG. 9A is a perspective view of an air filter device in accordance with principles of the present disclosure.
Figure 9B:
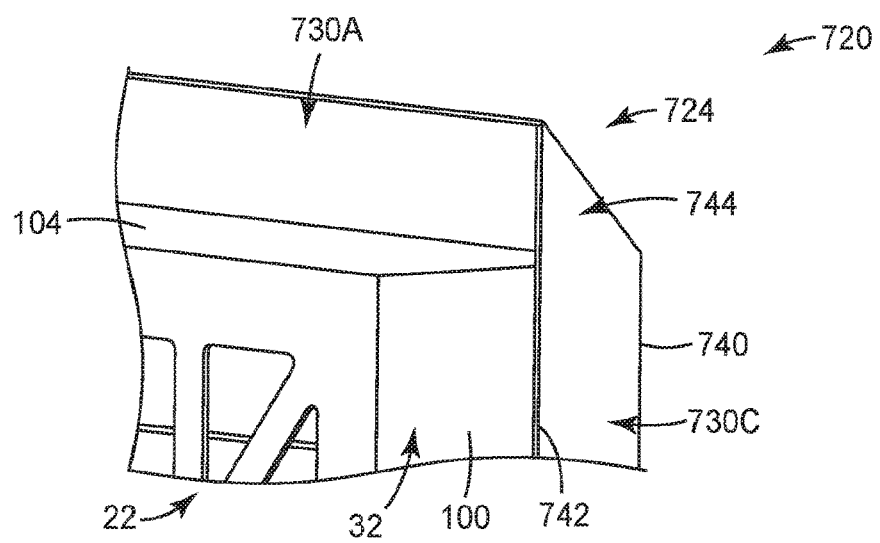
FIG. 9B is an enlarged view of a portion of the air filter device of FIG. 9A.

Another air filter device 720 including an example expansion unit 724 (referenced generally) in accordance with principles of the present disclosure applied to the air filter unit 22 is shown in FIGS. 9A and 9B. As a point of reference, the expansion unit 724 can be pre-assembled to the air filter unit 22 in a delivery condition of the air filter device 720. The expansion unit 724 can be configured to self-deploy to the expanded state reflected by FIGS. 9A and 9B in the presence of airflow as described below.

The expansion unit 724 includes first-fourth flanges 730A-730D. The flanges 730A-730D can be akin to the flanges 330 (FIG. 5A) described above, and are generally sized and shaped in accordance with a designated region of the air filter unit 22. For example, the first and second flanges 730A, 730B are each generally sized and shaped in accordance with dimensions of one of the end frame structures 104 to effectuate an expanded state length $L_E$ (not specifically identified in FIGS. 9A and 9B for ease of illustration) that is greater than the initial state length $L_I$ (FIG. 1). The third and fourth flanges 730C, 730D are each generally sized and shaped in accordance with dimensions of one of the side frame structures 100 to effectuate an expanded state width $W_E$ (not specifically identified in FIGS. 9A and 9B for ease of illustration) that is greater than the initial state width $W_I$ (FIG. 1).

Apart from dimensions, each of the flanges 730A-730D can have a similar construction. For example, each of the flanges 730A-730D can be a lightweight yet relative stiff material defining a fixed end 740 opposite a free end 742 (identified in FIG. 9B for the third flange 730C). The fixed end 340 can be connected to the corresponding frame structure of the air filter unit 22 (e.g., the fixed end 740 of the third flange 730C is connected to the side frame structure 100) in a manner permitting pivoting movement at the point or line of connection. The free end 742 of each of the flanges 730A-730D is free of direct connection or attachment to the air filter unit 22. Finally, a continuous connection feature 744 (drawn generally in FIGS. 9A and 9B) is established or provided between orthogonally adjacent ones of the flanges 730A-730D that permits pivoting movement of the corresponding flanges while maintaining a continuous obstruction to airflow. For example, the first flange 730A and the third flange 730C are orthogonal to one another, and are connected to one another at the connection feature 744. The connection feature 744 is configured such that the flanges 730A, 730C can readily transition from a collapsed arrangement (not shown), in which the flanges 730A, 730C are collapsed on to the outer frame assembly 32, to the expanded state shown. The connection feature 744 remains intact throughout this transition, presenting a continuous structure or obstruction to airflow. For example, the connection feature 744 can include the flanges 730A, 730C providing complimentary engagement features, such as a tab-and-slot type connection, that permits sliding movement of the flanges 730A, 730C relative to one another. Alternatively, a series of folds can be imparted into a material defining an interface between the flanges 730A, 730C (e.g., akin to origami). In yet other embodiments, a separate corner piece (not shown) can be assembled to the flanges 730A, 730C in defining the connection feature 744.

In some embodiments the flanges 730A-730D are each a paperboard body integrally formed with the outer frame assembly 32, with a fold line being formed at the line of interface between each of the flanges 730A-730D and the corresponding frame structure 100, 104 of the outer frame assembly 32 to define the fixed end 740.

During use, the air filter device 720 can be installed such that the free end 742 of each of the flanges 730A-730D faces the upstream direction of airflow through the air filter compartment. During operation of the air handling device, airflow (designated by arrow F in FIG. 9A) will interface between the flanges 730A-73D and the outer frame assembly 32, forcing the flanges 730A-730D to extend outwardly relative to the outer frame assembly 32 (e.g., the flanges 730A-730D are caused to pivot relative to the outer frame assembly 32 at the corresponding fixed end 740, with the corresponding free end 742 moving outwardly away from the outer frame assembly 32). The expansion unit 724 can optionally be viewed as self-energizing to the expanded state. In the expanded state, the flanges 730A-730D can be brought into contact with framework of the air filter compartment, promoting a seal between the air filter device 720 and the air filter compartment.

Figure 10A:
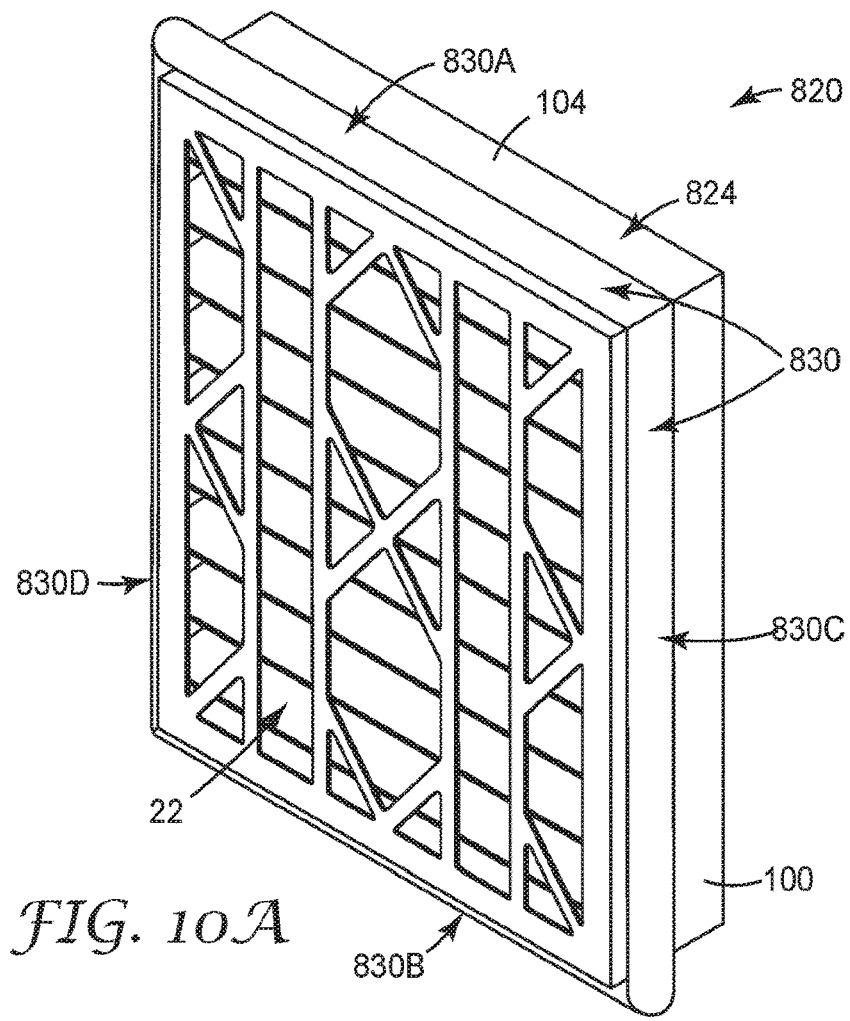
FIG. 10A is a perspective view of an air filter device in accordance with principles of the present disclosure.
Figure 10B:
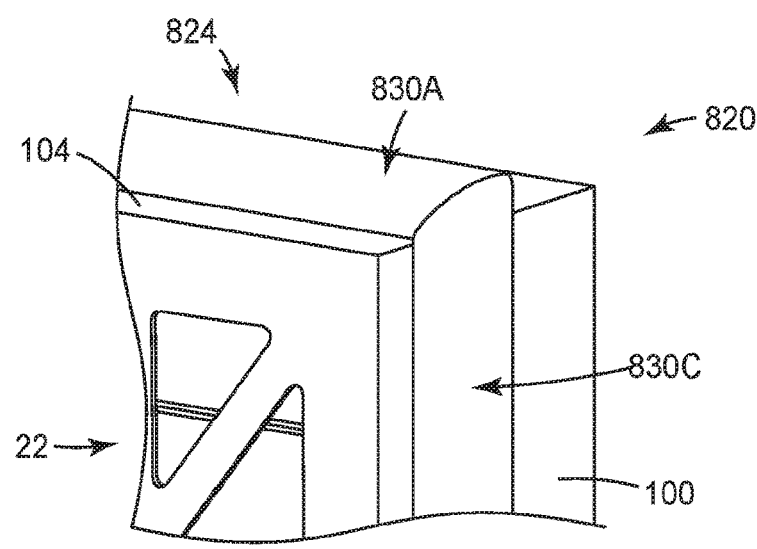
FIG. 10B is an enlarged view of a portion of the air filter device of FIG. 10A.

Another air filter device 820 including an example expansion unit 824 (referenced generally) in accordance with principles of the present disclosure applied to the air filter unit 22 is shown in FIGS. 10A and 10B. As a point of reference, FIGS. 10A and 10B reflect a possible expanded state of the air filter device 820 in which the expansion unit 824 has been mounted to the air filter unit 22. Conversely, a possible delivery condition (not shown) of the air filter device 820 includes the expansion unit 824 not yet mounted to the air filter unit 22 (e.g., a user can receive the air filter device 820 in the delivery condition, and then mount the expansion unit 824 (or portions thereof) to the air filter unit 22 in achieving the possible expanded state).

The expansion unit 824 includes one or more seal bodies 830. The seal bodies 830 are generally sized and shaped in accordance with a designated region of the air filter unit 22, and can include first-fourth seal bodies 830A-830D. The first and second seal bodies 830A, 830B can each be generally sized and shaped in accordance with dimensions of one of the end frame structures 104 to effectuate an expanded state length $L_E$ (not specifically identified in FIGS. 10A and 10B for ease of illustration) that is greater than the initial state length $L_I$ (FIG. 1). The third and fourth seal bodies 830C, 830D can each be generally sized and shaped in accordance with dimensions of one of the side frame structures 100 to effectuate an expanded state width $W_E$ (not specifically identified in FIGS. 10A and 10B for ease of illustration) that is greater than the initial state width $W_I$ (FIG. 1). In other embodiments, the expansion unit 824 can include less than all of the first-fourth seal bodies 830A-830D.

Apart from dimensions, each of the seal bodies 830 can have a similar construction. For example, each of the seal bodies 830 can be formed of a light weight, resilient, at least slightly compressible material capable of maintaining a designated shape when subjected to compression. In some embodiments, the seal bodies 830 can be a foam material (e.g., open or closed cell foams, natural foams, synthetic foams, etc.). In related embodiments, the seal bodies 830 can be hollow structures. Other materials, such as rubber, plastic, etc., are also envisioned. In some embodiments, the seal bodies 830 associated can each be a pre-cut, hollow foam strip, sized and shaped in accordance with geometries of the corresponding air filter unit 22 components (e.g., the first and second seal bodies 830A, 830B are both pre-cut to a size and shape corresponding with dimensions of one of the end frame structures 104; the third and fourth seal bodies 830C, 830D are pre-cut to a size and shape corresponding with dimensions of one of the side frame structures 100).

In some embodiments, the air filter device 820 is initially provided to a user with the seal bodies 830A-830D mounted to the air filter unit 22 (e.g., via an adhesive or other fastener). In related embodiments, one or more of the seal bodies 830A-830D are pre-assembled to the air filter unit 22 in a releasable fashion (e.g., a pressure sensitive adhesive) that permits a user to selectively remove one or more of the pre-applied seal bodies 830A-830D. In yet other embodiments, the delivery condition of the air filter device 820 can include the seal bodies 830A-830D apart from the air filter unit 22. With these configurations, the expansion unit 824 can further include one or more strips of double-sided adhesive tape or other fastening devices (e.g., complimentary strips of hook-and-loop fasteners) that are employed by a user to secure the seal bodies 830A-830C at the locations shown. Alternatively, the seal bodies 830A-830D can be coated with an adhesive that is temporarily covered by a release liner, the air filter unit 22 can be coated with an adhesive at desired locations and that are temporarily covered by a release liner, etc.

With embodiments in which the air filter device 820 is provided to a user with the seal bodies 830A-830D permanently assembled to the air filter unit 22, the user installs the air filter device 820 to the air filter compartment (not shown). With embodiments in which the air filter device 820 is provided to a user with the seal bodies 830A-830D uncoupled from the air filter unit 22 or with the seal bodies 830A-830D removably pre-mounted to the air filter unit 22, the user can first compare an estimated size of the air filter compartment with the length and width $L_I$, $W_I$ dimensions of the air filter unit 22. Based on this comparison, one or more of the seal bodies 830A-830D can be mounted to (or removed from) the air filter unit 22 as described above, with the so-configured air filter device 820 then being installed to the air filter compartment. With circumstances in which at least one of the seal bodies 830A-830D is mounted to the air filter unit 22 upon installation, the seal body/bodies 830A-830D can be brought into contact with framework of the air filter compartment, promoting a seal between the air filter device 820 and the air filter compartment.

Features or components of two or more of the expansion units 224, 324, 424, 524, 624, 724, 824 described above can be combined. For example, any of the expansion units described above can further include at least the depth standoffs 230C (FIG. 4A).

Returning to FIG. 1, the air filter devices of the present disclosure are useful in a wide variety of air handling applications. In some embodiments, the air filter device can be configured for use with HVAC systems. With these and other embodiments, a user is afforded the ability to custom fit the air filter device 20 (via expansion in one or more of the length, width, and depth directions L, W, D) to an exact size of the air filter compartment provided with the user's actual HVAC system. In related embodiments, the air filter device 20 can be provided as a universal product, appropriate for use with a number of different HVAC systems that might otherwise have slightly different air filter compartment dimensions. By way of example, different HVAC system manufacturers may each specify to a user that a 16"×20"×4" air filter should be used with their HVAC system, yet the actual air filter compartment is sized and shaped to provide a best fit with slightly different dimensions (e.g., 16"×19"×4"; 16"×21"×4"; 15"×20"×4"; 17"×20"×4"; 16"×20"×3.5"; 16"×20"×4.5"; etc.). With this in mind, the air filter device 20 of the present disclosure can be configured such that outer length, width and depth dimensions of the air filter unit 22 correspond with the smallest expected air filter compartment dimensions utilized by several different HVAC system manufacturers. Continuing with the above example, then, the air filter unit 20 can be configured to have outer dimensions of 15"×19"×3.5", and promoted to potential users as being acceptable for use with any HVAC system requiring a 16"×20"×4" air filter. Upon evaluating the size of the actual air filter compartment, the user can then, if necessary, effectively expand the 15"×19"×3.5" air filter unit 22 in one or more of the length, width and depth directions L, W, D as described above, transitioning the air filter device 20 to an expanded state having dimensions corresponding with those of the actual air filter compartment. Similar benefits can be recognized in other, non-HVAC air filter applications, such as with room air purifier filters, window air filters, etc.

The air filter devices and related methods of use of the present disclosure provide a marked improvement over previous designs. By promoting simple, manual expansion in one or more of the length, width and depth directions, the air filter devices of the present disclosure afford a user the ability to achieve a "best fit" with the air handling device to which the air filter is installed.

Although the present disclosure has been described with reference to preferred embodiments, workers skilled in the art will recognize that changes can be made in form and detail without departing from the spirit and scope of the present disclosure.

What is claimed is:

1. An air filter device comprising:
   an air filter unit including:
      a filter media assembly defining a perimeter,
      an outer frame assembly arranged about the perimeter and establishing exterior length, width and depth dimensions of the air filter device in an initial state, outer frame assembly including a first frame member covering a first edge of the perimeter; and
   an expansion unit configured to effect an expanded state of the air filter device, the expansion unit including a first flange configured to project from the first frame member in the expanded state, wherein the first flange includes a panel and a first tab for selectively locking the panel relative to the first frame member;

wherein at least one of the exterior length, width and depth dimensions of the air filter device is greater in the expanded state than in the initial state.

2. The air filter device of claim 1, wherein at least a portion of the expansion unit is provided apart from the air filter unit in a delivery condition of the air filter device, and wherein the at least a portion of the expansion unit is configured for selective assembly to the outer frame assembly.

3. The air filter device of claim 1, wherein at least a portion of the expansion unit is attached to the outer frame assembly in a delivery condition of the air filter device, and wherein the at least a portion of the expansion unit is configured to be selectively extended away from the outer frame assembly to establish the expanded state of the air filter device.

4. The air filter device of claim 1, wherein the air filter device is configured to be installable to a compartment of an air handling device in each of the initial and expanded states.

5. The air filter device of claim 4, wherein the initial state includes the expansion unit disassembled from the air filter unit such that the air filter unit can be installed to the compartment of the air handling device, or wherein the initial state includes the expansion unit connected to the air filter unit and arranged in an un-expanded arrangement.

6. The air filter device of claim 1, wherein the expansion unit includes at least a first standoff configured for selective mounting to the outer frame assembly.

7. The air filter device of claim 6, wherein the first standoff is sized for mounting to a major face of the air filter unit in the expanded state, and further wherein upon mounting of the first standoff to the air filter unit, the depth dimension of the expanded state is greater than the depth dimension of the initial state, the length dimension of the expanded state is greater than the length dimension of the initial state, or the width dimension of the expanded state is greater than the width dimension of the initial state.

8. The air filter device of claim 6, wherein the expansion unit further includes a second standoff apart from the first standoff.

9. The air filter device of claim 8, wherein the expansion unit further includes a third standoff apart from the first and second standoffs, wherein the first standoff is configured for mounting to a major face of the air filter unit, the second standoff is configured for mounting to a side frame member of the outer frame assembly, and the third standoff is configured for mounting to an end frame member of the outer frame assembly.

10. The air filter device of claim 1, wherein the first side flange defines a fixed end attached to the first frame member and a free end opposite the fixed end, and further wherein the expanded state includes the free end laterally spaced from the first frame member.

11. The air filter device of claim 1, wherein outer frame assembly further includes a second frame member covering a second end of the perimeter, and further wherein the expansion unit further includes a second flange configured to project from the second frame member in the expanded state.

12. The air filter device of claim 10, wherein the expansion unit further includes a deflection device configured to bias the free end away from the first frame member.

13. The air filter device of claim 1, wherein the panel defines a fixed end pivotably connected to the first frame member, a free end opposite the fixed end, and opposing, first and second sides, further wherein the first tab projects from the first side.

14. The air filter device of claim 13, wherein the first tab terminates at a leading end opposite the first side, the leading end configured to selectively interface with respective ones of a plurality of slots.

15. The air filter device of claim 14, wherein the outer frame assembly includes a second frame member covering a second edge of the perimeter, the second frame member arranged orthogonal to the first frame member, and further wherein the plurality of slots are defined in the second frame member, and wherein the first tab and the plurality of slots are configured to selective lock the panel at a plurality of different angular orientations of the panel relative to the first frame member.

16. The air filter device of claim 1, wherein the perimeter includes opposing, first and second side edges and opposing, first and second end edges, and further wherein the outer frame assembly includes first and second side frame members covering the first and second side edges, respectively, and first and second end frame members covering the first and second end edges, respectively, and further wherein the expansion unit includes a first flange configured to project from the first side frame member in the expanded state, a second flange configured to project from the second side frame member in the expanded state, a third flange configured to project from the first end frame member in the expanded state, and a fourth flange configured to project from the second end frame member in the expanded state, wherein each of the flanges includes a fixed end connected to the corresponding frame member and a free end opposite the fixed end.

17. The air filter device of claim 1, wherein the expansion unit includes a first hollow seal body projecting from the outer frame assembly in the expanded state.

18. A method of installing an air filter to an air handling device, the method comprising:
receiving an air filter device in an initial state, the air filter device including:
an air filter unit including a filter media assembly defining a perimeter, and an outer frame assembly arranged about the perimeter and establishing exterior length, width and depth dimensions of the air filter device in the initial state, and
an expansion unit configured to effect an expanded state of the air filter device;
evaluating a size of an air filter compartment provided with the air handling device;
arranging the expansion unit relative to the outer frame assembly based upon the evaluation; and
inserting the air filter device into the air filter compartment.

* * * * *